US012565143B1

(12) United States Patent
Dhamija et al.

(10) Patent No.: US 12,565,143 B1
(45) Date of Patent: Mar. 3, 2026

(54) VEHICLE DEVICE WITH SAFETY ALERT SYSTEM

(71) Applicant: Samsara Inc., San Francisco, CA (US)

(72) Inventors: Akshay Raj Dhamija, Campbell, CA (US); Alexander Viktor Puzyk, San Francisco, CA (US); William Nathan Hurst, Seattle, WA (US); Cole Jurden, Kansas City, MO (US); Shirish Nair, Shoreline, WA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/427,558

(22) Filed: Jan. 30, 2024

(51) Int. Cl.
| | |
|---|---|
| *H04N 23/611* | (2023.01) |
| *B60Q 9/00* | (2006.01) |
| *B60R 11/00* | (2006.01) |
| *G06V 10/70* | (2022.01) |
| *G06V 20/56* | (2022.01) |
| *G10L 25/51* | (2013.01) |

(52) U.S. Cl.
CPC ............... *B60Q 9/00* (2013.01); *B60R 11/00* (2013.01); *G06V 10/70* (2022.01); *G06V 20/588* (2022.01); *G10L 25/51* (2013.01); *G06V 2201/10* (2022.01)

(58) Field of Classification Search
CPC .......... B60Q 9/00; B60R 11/00; G06V 10/70; G06V 20/588; G06V 2201/10; G10L 25/51
See application file for complete search history.

(56) References Cited

U.S. PATENT DOCUMENTS

| | | | |
|---|---|---|---|
| 4,671,111 | A | 6/1987 | Lemelson |
| 5,825,283 | A | 10/1998 | Camhi |
| 5,917,433 | A | 6/1999 | Keillor et al. |
| 6,064,299 | A | 5/2000 | Lesesky et al. |
| 6,098,048 | A | 8/2000 | Dashefsky et al. |

(Continued)

FOREIGN PATENT DOCUMENTS

| | | |
|---|---|---|
| CN | 111047179 A | 4/2020 |
| DE | 10 2004 015 221 A1 | 10/2005 |

(Continued)

OTHER PUBLICATIONS

US 11,450,210 B2, 09/2022, Tsai et al. (withdrawn)

(Continued)

*Primary Examiner* — Gims S Philippe
(74) *Attorney, Agent, or Firm* — Knobbe, Martens, Olson & Bear, LLP

(57) ABSTRACT

A vehicle device may be configured to execute one or more event models, such as based on input from one or more of the audio capture devices, image capture devices, and/or other sensors associated with the vehicle device, to intelligently detect safety events, such as unsignaled lane departures, in real-time. Detection of a safety event may trigger an in-vehicle alert to make the driver aware of the safety risk. The vehicle device may include logic for determining which asset data to transmit to a backend server in response to detection of a safety event, as well as which asset data to transmit to the backend server in response to analysis of sensor data that did not trigger a safety event. The asset data transmitted to the backend server may be further analyzed to determine if any action should be taken by the user of the backend server.

24 Claims, 7 Drawing Sheets

(56) References Cited

U.S. PATENT DOCUMENTS

| | | | |
|---|---|---|---|
| 6,157,864 | A | 12/2000 | Schwenke et al. |
| 6,253,129 | B1 | 6/2001 | Jenkins et al. |
| 6,317,668 | B1 | 11/2001 | Thibault et al. |
| 6,411,203 | B1 | 6/2002 | Lesesky et al. |
| 6,421,590 | B2 | 7/2002 | Thibault |
| 6,452,487 | B1 | 9/2002 | Krupinski |
| 6,505,106 | B1 | 1/2003 | Lawrence et al. |
| 6,651,063 | B1 | 11/2003 | Vorobiev |
| 6,714,894 | B1 | 3/2004 | Tobey et al. |
| 6,718,239 | B2 | 4/2004 | Rayner |
| 6,741,165 | B1 | 5/2004 | Langfahl et al. |
| 6,801,920 | B1 | 10/2004 | Wischinski |
| 7,117,075 | B1 | 10/2006 | Larschan et al. |
| 7,139,780 | B2 | 11/2006 | Lee et al. |
| 7,209,959 | B1 | 4/2007 | Campbell et al. |
| 7,233,684 | B2 | 6/2007 | Fedorovskaya et al. |
| 7,386,376 | B2 | 6/2008 | Basir et al. |
| 7,389,178 | B2 | 6/2008 | Raz et al. |
| 7,398,298 | B2 | 7/2008 | Koch |
| 7,492,938 | B2 | 2/2009 | Brinson, Jr. et al. |
| 7,526,103 | B2 | 4/2009 | Schofield et al. |
| 7,555,378 | B2 | 6/2009 | Larschan et al. |
| 7,596,417 | B2 | 9/2009 | Fister et al. |
| 7,606,779 | B2 | 10/2009 | Brinson, Jr. et al. |
| 7,715,961 | B1 | 5/2010 | Kargupta |
| 7,769,499 | B2 | 8/2010 | McQuade et al. |
| 7,844,088 | B2 | 11/2010 | Brinson, Jr. et al. |
| 7,859,392 | B2 | 12/2010 | McClellan et al. |
| 7,877,198 | B2 | 1/2011 | Tenzer et al. |
| 7,881,838 | B2 | 2/2011 | Larschan et al. |
| 7,957,936 | B2 | 6/2011 | Eryurek et al. |
| 8,019,581 | B2 | 9/2011 | Sheha et al. |
| 8,024,311 | B2 | 9/2011 | Wood et al. |
| 8,032,277 | B2 | 10/2011 | Larschan et al. |
| 8,140,358 | B1 | 3/2012 | Ling et al. |
| 8,156,108 | B2 | 4/2012 | Middleton et al. |
| 8,156,499 | B2 | 4/2012 | Foulger et al. |
| 8,169,343 | B2 | 5/2012 | Sheha et al. |
| 8,175,992 | B2 | 5/2012 | Bass, II et al. |
| 8,230,272 | B2 | 7/2012 | Middleton et al. |
| 8,260,489 | B2 | 9/2012 | Nielsen et al. |
| 8,417,402 | B2 | 4/2013 | Basir |
| 8,442,508 | B2 | 5/2013 | Harter et al. |
| 8,457,395 | B2 | 6/2013 | Boncyk et al. |
| 8,509,412 | B2 | 8/2013 | Sheha et al. |
| 8,543,625 | B2 | 9/2013 | Middleton et al. |
| 8,560,164 | B2 | 10/2013 | Nielsen et al. |
| 8,615,555 | B2 | 12/2013 | Koch |
| 8,625,885 | B2 | 1/2014 | Brinson, Jr. et al. |
| 8,626,568 | B2 | 1/2014 | Warkentin et al. |
| 8,633,672 | B2 | 1/2014 | Jung et al. |
| 8,669,857 | B2 | 3/2014 | Sun et al. |
| 8,682,572 | B2 | 3/2014 | Raz et al. |
| 8,706,409 | B2 | 4/2014 | Mason et al. |
| 8,831,825 | B2 | 9/2014 | Shah et al. |
| 8,836,784 | B2 | 9/2014 | Erhardt et al. |
| 8,918,229 | B2 | 12/2014 | Hunt et al. |
| 8,953,228 | B1 | 2/2015 | Mehers |
| 8,989,914 | B1 | 3/2015 | Nemat-Nasser et al. |
| 8,989,959 | B2 | 3/2015 | Plante et al. |
| 8,996,240 | B2 | 3/2015 | Plante |
| 9,024,744 | B2 | 5/2015 | Klose et al. |
| 9,053,590 | B1 | 6/2015 | Kator et al. |
| 9,137,498 | B1 | 9/2015 | L'Heureux et al. |
| 9,147,335 | B2 | 9/2015 | Raghunathan et al. |
| 9,152,609 | B2 | 10/2015 | Schwartz et al. |
| 9,165,196 | B2 | 10/2015 | Kesavan et al. |
| 9,170,913 | B2 | 10/2015 | Hunt et al. |
| 9,189,895 | B2 | 11/2015 | Phelan et al. |
| 9,230,250 | B1 | 1/2016 | Parker et al. |
| 9,230,437 | B2 | 1/2016 | Brinton et al. |
| 9,280,435 | B2 | 3/2016 | Hunt et al. |
| 9,311,271 | B2 | 4/2016 | Wright |
| 9,344,683 | B1 | 5/2016 | Nemat-Nasser et al. |
| 9,349,228 | B2 | 5/2016 | Ochsendorf et al. |
| 9,384,111 | B2 | 7/2016 | Hunt et al. |
| 9,389,147 | B1 | 7/2016 | Lambert et al. |
| 9,402,060 | B2 | 7/2016 | Plante |
| 9,412,282 | B2 | 8/2016 | Hunt et al. |
| 9,439,280 | B2 | 9/2016 | Chang et al. |
| 9,445,270 | B1 | 9/2016 | Bicket et al. |
| 9,477,639 | B2 | 10/2016 | Fischer et al. |
| 9,477,989 | B2 | 10/2016 | Grimm et al. |
| 9,527,515 | B2 | 12/2016 | Hunt et al. |
| 9,594,725 | B1 | 3/2017 | Cook et al. |
| 9,672,667 | B2 | 6/2017 | Mason et al. |
| 9,688,282 | B2 | 6/2017 | Cook et al. |
| 9,728,015 | B2 | 8/2017 | Kwak |
| 9,761,063 | B2 | 9/2017 | Lambert et al. |
| 9,761,067 | B2 | 9/2017 | Plante et al. |
| 9,811,536 | B2 | 11/2017 | Morris et al. |
| 9,818,088 | B2 | 11/2017 | Penilla et al. |
| 9,846,979 | B1 | 12/2017 | Sainaney et al. |
| 9,849,834 | B2 | 12/2017 | Reed et al. |
| 9,852,625 | B2 | 12/2017 | Victor et al. |
| 9,892,376 | B2 | 2/2018 | Pfeiffer et al. |
| 9,922,567 | B2 | 3/2018 | Molin et al. |
| 9,934,628 | B2 | 4/2018 | Kreiner et al. |
| 9,996,980 | B1 | 6/2018 | Gonzalez et al. |
| 10,015,452 | B1 | 7/2018 | Schofield et al. |
| 10,033,706 | B2 | 7/2018 | Bicket et al. |
| 10,040,459 | B1 | 8/2018 | Kukreja |
| 10,065,652 | B2 | 9/2018 | Shenoy et al. |
| 10,068,392 | B2 | 9/2018 | Cook et al. |
| 10,075,669 | B2 | 9/2018 | Vanman et al. |
| 10,083,547 | B1 | 9/2018 | Tomatsu |
| 10,085,149 | B2 | 9/2018 | Bicket et al. |
| 10,094,308 | B2 | 10/2018 | Kolhouse et al. |
| 10,102,495 | B1 | 10/2018 | Zhang et al. |
| 10,127,810 | B2 | 11/2018 | Durie, Jr. et al. |
| 10,157,321 | B2 | 12/2018 | Becker et al. |
| 10,173,486 | B1 | 1/2019 | Lee et al. |
| 10,173,544 | B2 | 1/2019 | Hendrix et al. |
| 10,196,071 | B1 | 2/2019 | Rowson et al. |
| 10,206,107 | B2 | 2/2019 | Bicket et al. |
| 10,223,935 | B2 | 3/2019 | Sweany et al. |
| 10,275,959 | B2 | 4/2019 | Ricci |
| 10,286,875 | B2 | 5/2019 | Penilla et al. |
| 10,290,036 | B1 | 5/2019 | Gella et al. |
| 10,311,749 | B1 | 6/2019 | Kypri et al. |
| 10,336,190 | B2 | 7/2019 | Yokochi et al. |
| 10,388,075 | B2 | 8/2019 | Schmirler et al. |
| 10,389,739 | B2 | 8/2019 | Solotorevsky |
| 10,390,227 | B2 | 8/2019 | Bicket et al. |
| 10,444,949 | B2 | 10/2019 | Scott et al. |
| 10,445,559 | B2 | 10/2019 | Joseph et al. |
| 10,459,444 | B1 | 10/2019 | Kentley-Klay |
| 10,460,183 | B2 | 10/2019 | Welland et al. |
| 10,460,600 | B2 | 10/2019 | Julian et al. |
| 10,471,955 | B2 | 11/2019 | Kouri et al. |
| 10,486,709 | B1 | 11/2019 | Mezaael |
| 10,489,222 | B2 | 11/2019 | Sathyanarayana et al. |
| 10,523,904 | B2 | 12/2019 | Mahmoud et al. |
| 10,573,183 | B1 | 2/2020 | Li et al. |
| 10,579,123 | B2 | 3/2020 | Tuan et al. |
| 10,609,114 | B1 | 3/2020 | Bicket et al. |
| 10,621,873 | B1 | 4/2020 | Spiel et al. |
| 10,623,899 | B2 | 4/2020 | Watkins et al. |
| 10,632,941 | B2 | 4/2020 | Chauncey et al. |
| 10,652,335 | B2 | 5/2020 | Botticelli |
| 10,715,976 | B2 | 7/2020 | Hoffner et al. |
| 10,762,363 | B2 | 9/2020 | Watanabe |
| 10,782,691 | B2 | 9/2020 | Suresh et al. |
| 10,788,990 | B2 | 9/2020 | Kim et al. |
| 10,789,840 | B2 | 9/2020 | Boykin et al. |
| 10,803,496 | B1 | 10/2020 | Hopkins |
| 10,818,109 | B2 | 10/2020 | Palmer et al. |
| 10,827,324 | B1 | 11/2020 | Hajimiri et al. |
| 10,843,659 | B1 | 11/2020 | Innocenzi et al. |
| 10,848,670 | B2 | 11/2020 | Gatti et al. |
| 10,878,030 | B1 | 12/2020 | Lambert et al. |
| 10,969,852 | B2 | 4/2021 | Tuan et al. |
| 10,979,871 | B2 | 4/2021 | Hajimiri et al. |
| 10,999,269 | B2 | 5/2021 | Bicket et al. |

(56) References Cited

U.S. PATENT DOCUMENTS

| | | | |
|---|---|---|---|
| 10,999,374 B2 | 5/2021 | ElHattab et al. | |
| 11,046,205 B1 | 6/2021 | Govan et al. | |
| 11,069,257 B2 | 7/2021 | Palmer et al. | |
| 11,080,568 B2 | 8/2021 | ElHattab et al. | |
| 11,122,488 B1 | 9/2021 | Lloyd et al. | |
| 11,126,910 B1 | 9/2021 | Akhtar et al. | |
| 11,127,130 B1 | 9/2021 | Jain et al. | |
| 11,131,986 B1 | 9/2021 | Gal et al. | |
| 11,132,853 B1 | 9/2021 | Akhtar et al. | |
| 11,137,744 B1 | 10/2021 | Heddleston et al. | |
| 11,142,175 B2 | 10/2021 | Chow et al. | |
| 11,158,177 B1 | 10/2021 | ElHattab et al. | |
| 11,184,422 B1 | 11/2021 | Bicket et al. | |
| 11,188,046 B1 | 11/2021 | ElHattab et al. | |
| 11,190,373 B1 | 11/2021 | Stevenson et al. | |
| 11,204,637 B2 | 12/2021 | Tuan et al. | |
| 11,260,878 B2 | 3/2022 | Palmer et al. | |
| 11,341,786 B1 | 5/2022 | Calmer et al. | |
| 11,349,901 B1 | 5/2022 | Duffield et al. | |
| 11,352,013 B1 * | 6/2022 | Srinivasan | G06V 20/44 |
| 11,352,014 B1 | 6/2022 | Srinivasan et al. | |
| 11,356,605 B1 | 6/2022 | Shemet et al. | |
| 11,356,909 B1 | 6/2022 | Lloyd | |
| 11,365,980 B1 | 6/2022 | Akhtar et al. | |
| 11,386,325 B1 | 7/2022 | Srinivasan et al. | |
| 11,436,844 B2 | 9/2022 | Carruthers et al. | |
| 11,451,610 B1 | 9/2022 | Saunders et al. | |
| 11,451,611 B1 | 9/2022 | Saunders et al. | |
| 11,460,507 B2 | 10/2022 | Lloyd et al. | |
| 11,464,079 B1 | 10/2022 | Aschenbener et al. | |
| 11,479,142 B1 | 10/2022 | Govan et al. | |
| 11,494,921 B2 | 11/2022 | ElHattab et al. | |
| 11,522,857 B1 | 12/2022 | Symons et al. | |
| 11,532,169 B1 | 12/2022 | Hassan et al. | |
| 11,558,449 B1 | 1/2023 | Bicket et al. | |
| 11,595,632 B2 | 2/2023 | Tsai et al. | |
| 11,599,097 B1 | 3/2023 | Gal et al. | |
| 11,606,736 B1 | 3/2023 | Lloyd et al. | |
| 11,611,621 B2 | 3/2023 | ElHattab et al. | |
| 11,615,141 B1 | 3/2023 | Hoye et al. | |
| 11,620,909 B2 | 4/2023 | Tsai et al. | |
| 11,627,252 B2 | 4/2023 | Delegard et al. | |
| 11,641,388 B1 | 5/2023 | Saunders et al. | |
| 11,641,604 B1 | 5/2023 | Lloyd | |
| 11,643,102 B1 | 5/2023 | Calmer et al. | |
| 11,659,060 B2 | 5/2023 | Davis et al. | |
| 11,665,223 B1 | 5/2023 | Duffield et al. | |
| 11,669,714 B1 | 6/2023 | Akhtar et al. | |
| 11,671,478 B1 | 6/2023 | Saunders et al. | |
| 11,674,813 B1 | 6/2023 | Chung et al. | |
| 11,675,042 B1 | 6/2023 | Lloyd et al. | |
| 11,683,579 B1 | 6/2023 | Symons et al. | |
| 11,688,211 B1 | 6/2023 | Calmer et al. | |
| 11,694,317 B1 | 7/2023 | Jain et al. | |
| 11,704,984 B1 | 7/2023 | ElHattab et al. | |
| 11,709,500 B2 | 7/2023 | Lloyd et al. | |
| 11,710,409 B2 | 7/2023 | Nanda et al. | |
| 11,720,087 B1 | 8/2023 | Heddleston et al. | |
| 11,727,054 B2 | 8/2023 | Grandhi et al. | |
| 11,731,469 B1 | 8/2023 | McGillan | |
| 11,736,312 B1 | 8/2023 | Xiao et al. | |
| 11,741,760 B1 | 8/2023 | Dubin et al. | |
| 11,748,377 B1 | 9/2023 | Zhang et al. | |
| 11,752,895 B1 | 9/2023 | Govan et al. | |
| 11,756,346 B1 | 9/2023 | Wu et al. | |
| 11,756,351 B1 | 9/2023 | Akhtar et al. | |
| 11,758,096 B2 | 9/2023 | Shah et al. | |
| 11,776,328 B2 | 10/2023 | Yang et al. | |
| 11,780,446 B1 | 10/2023 | Srinivasan et al. | |
| 11,782,930 B2 | 10/2023 | McGee et al. | |
| 11,787,413 B2 | 10/2023 | Tsai et al. | |
| 11,798,187 B2 | 10/2023 | Zaheer et al. | |
| 11,798,298 B2 | 10/2023 | Hassan et al. | |
| 11,800,317 B1 | 10/2023 | Dugar et al. | |
| 11,838,884 B1 | 12/2023 | Dergosits et al. | |
| 11,842,577 B1 | 12/2023 | Harrison et al. | |
| 11,847,911 B2 | 12/2023 | ElHattab et al. | |
| 11,855,801 B1 | 12/2023 | Stevenson et al. | |
| 11,861,955 B1 | 1/2024 | Dubin et al. | |
| 11,863,712 B1 | 1/2024 | Young et al. | |
| 11,866,055 B1 | 1/2024 | Srinivasan et al. | |
| 11,868,919 B1 | 1/2024 | Zhang et al. | |
| 11,875,580 B2 | 1/2024 | Hassan et al. | |
| 11,875,683 B1 | 1/2024 | Tsai et al. | |
| 11,887,386 B1 * | 1/2024 | Davis | G07C 5/0816 |
| 11,890,962 B1 | 2/2024 | Govan et al. | |
| 11,937,152 B2 | 3/2024 | Hajimiri et al. | |
| 11,938,948 B1 | 3/2024 | Davis et al. | |
| 11,959,772 B2 | 4/2024 | Robbins et al. | |
| 11,974,410 B1 | 4/2024 | Lin et al. | |
| 11,975,685 B1 | 5/2024 | Innocenzi et al. | |
| 11,989,001 B1 | 5/2024 | ElHattab et al. | |
| 11,995,546 B1 | 5/2024 | Srinivasan et al. | |
| 11,997,181 B1 | 5/2024 | Davis et al. | |
| 12,000,940 B1 | 6/2024 | Lloyd et al. | |
| 12,106,613 B2 | 10/2024 | Calmer et al. | |
| 12,117,546 B1 | 10/2024 | Lloyd et al. | |
| 12,126,917 B1 | 10/2024 | Shemet et al. | |
| 12,128,919 B2 | 10/2024 | Calmer et al. | |
| 12,140,445 B1 | 11/2024 | Akhtar et al. | |
| 12,150,186 B1 | 11/2024 | Aguilar et al. | |
| 12,165,360 B1 | 12/2024 | Jain et al. | |
| 12,168,445 B1 | 12/2024 | Srinivasan et al. | |
| 12,172,653 B1 | 12/2024 | Akhtar et al. | |
| 12,179,629 B1 | 12/2024 | Govan et al. | |
| 12,197,610 B2 | 1/2025 | Wen et al. | |
| 12,213,090 B1 | 1/2025 | Dergosits et al. | |
| 12,228,944 B1 | 2/2025 | Dubin et al. | |
| 12,253,617 B1 | 3/2025 | Aguilar et al. | |
| 12,256,021 B1 | 3/2025 | Torres et al. | |
| 12,260,616 B1 | 3/2025 | Rajan et al. | |
| 12,269,498 B1 | 4/2025 | Rommel et al. | |
| 12,289,181 B1 | 4/2025 | Stevenson et al. | |
| 12,306,010 B1 | 5/2025 | Rommel et al. | |
| 12,327,445 B1 | 6/2025 | Eberhardt et al. | |
| 12,328,639 B1 | 6/2025 | Smith et al. | |
| 12,344,168 B1 | 7/2025 | Wang et al. | |
| 12,346,712 B1 | 7/2025 | Eberhardt et al. | |
| 12,367,718 B1 | 7/2025 | Calmer et al. | |
| 12,368,903 B1 | 7/2025 | Lin et al. | |
| 12,426,007 B1 | 9/2025 | Aguilar et al. | |
| 12,445,285 B1 | 10/2025 | McHugh et al. | |
| 12,450,329 B1 | 10/2025 | Torres et al. | |
| 12,479,446 B1 | 11/2025 | Jurden et al. | |
| 12,501,178 B1 | 12/2025 | Shemet et al. | |
| 12,511,947 B1 | 12/2025 | Symons et al. | |
| 12,524,314 B1 | 1/2026 | Rajadurai et al. | |
| 2002/0061758 A1 | 5/2002 | Zarlengo et al. | |
| 2002/0128751 A1 | 9/2002 | Engstrom et al. | |
| 2002/0169850 A1 | 11/2002 | Batke et al. | |
| 2003/0081935 A1 | 5/2003 | Kirmuss | |
| 2003/0154009 A1 | 8/2003 | Basir et al. | |
| 2004/0093264 A1 | 5/2004 | Shimizu | |
| 2004/0236476 A1 | 11/2004 | Chowdhary | |
| 2004/0236596 A1 | 11/2004 | Chowdhary et al. | |
| 2005/0131585 A1 | 6/2005 | Luskin et al. | |
| 2005/0131646 A1 | 6/2005 | Camus | |
| 2005/0286774 A1 | 12/2005 | Porikli | |
| 2006/0167591 A1 | 7/2006 | McNally | |
| 2007/0050108 A1 | 3/2007 | Larschan et al. | |
| 2007/0173991 A1 | 7/2007 | Tenzer et al. | |
| 2008/0252487 A1 | 10/2008 | McClellan et al. | |
| 2008/0319602 A1 | 12/2008 | McClellan et al. | |
| 2009/0099724 A1 | 4/2009 | Kranz et al. | |
| 2009/0141939 A1 | 6/2009 | Chambers et al. | |
| 2009/0240427 A1 | 9/2009 | Siereveld et al. | |
| 2010/0030586 A1 | 2/2010 | Taylor et al. | |
| 2010/0049639 A1 | 2/2010 | Ferro et al. | |
| 2010/0281161 A1 | 11/2010 | Cohn et al. | |
| 2011/0060496 A1 | 3/2011 | Nielsen et al. | |
| 2011/0093306 A1 | 4/2011 | Nielsen et al. | |
| 2011/0234749 A1 | 9/2011 | Alon | |
| 2011/0276265 A1 | 11/2011 | Husain | |
| 2012/0109418 A1 | 5/2012 | Lorber | |

(56)  References Cited

U.S. PATENT DOCUMENTS

| | | |
|---|---|---|
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0073112 A1 | 3/2013 | Phelan et al. |
| 2013/0162421 A1 | 6/2013 | Inaguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |
| 2013/0244210 A1 | 9/2013 | Nath et al. |
| 2013/0250040 A1 | 9/2013 | Vitsnudel et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |
| 2015/0116114 A1 | 4/2015 | Boyles |
| 2015/0226563 A1 | 8/2015 | Cox et al. |
| 2015/0283912 A1 | 10/2015 | Shimizu et al. |
| 2015/0347121 A1 | 12/2015 | Harumoto |
| 2016/0046298 A1 | 2/2016 | DeRuyck et al. |
| 2016/0110066 A1 | 4/2016 | McCormick et al. |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0174485 A1 | 6/2018 | Stankoulov |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0329381 A1 | 11/2018 | Doh et al. |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0118655 A1 | 4/2019 | Grimes et al. |
| 2019/0120947 A1 | 4/2019 | Wheeler et al. |
| 2019/0147263 A1* | 5/2019 | Kuehnle .............. G07C 5/0866 |
| | | 340/439 |
| 2019/0174158 A1 | 6/2019 | Herrick et al. |
| 2019/0188847 A1 | 6/2019 | Gonzalez et al. |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0327613 A1 | 10/2019 | Bicket et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0050182 A1 | 2/2020 | Cheng et al. |
| 2020/0074326 A1 | 3/2020 | Balakrishnan et al. |
| 2020/0074397 A1 | 3/2020 | Burda et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0164509 A1 | 5/2020 | Shults et al. |
| 2020/0168094 A1 | 5/2020 | Shimodaira et al. |
| 2020/0283003 A1 | 9/2020 | Raichelgauz |
| 2020/0311602 A1 | 10/2020 | Hawley et al. |
| 2020/0312155 A1 | 10/2020 | Kelkar et al. |
| 2020/0327009 A1 | 10/2020 | Callison et al. |
| 2020/0327369 A1 | 10/2020 | Cruz et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0380806 A1 | 12/2020 | Tabata |
| 2020/0389415 A1 | 12/2020 | Zhao et al. |
| 2021/0006950 A1 | 1/2021 | Hajimiri et al. |
| 2021/0097315 A1 | 4/2021 | Carruthers et al. |
| 2021/0347328 A1* | 11/2021 | Bhattacharya ....... G05B 13/027 |
| 2021/0397908 A1 | 12/2021 | ElHattab et al. |
| 2022/0165073 A1 | 5/2022 | Shikii et al. |
| 2022/0289203 A1 | 9/2022 | Makilya et al. |
| 2022/0374737 A1 | 11/2022 | Dhara et al. |
| 2023/0077207 A1 | 3/2023 | Hassan et al. |
| 2023/0077868 A1* | 3/2023 | Burns ................... B60R 25/305 |
| | | 348/148 |
| 2023/0083504 A1* | 3/2023 | Burns ....................... G06T 7/70 |
| | | 705/4 |
| 2023/0139682 A1* | 5/2023 | Kale ........................ G06N 3/08 |
| | | 382/159 |
| 2023/0153735 A1 | 5/2023 | Dhara et al. |
| 2023/0169420 A1 | 6/2023 | Dhara et al. |
| 2023/0219592 A1 | 7/2023 | Calmer et al. |
| 2023/0281553 A1 | 9/2023 | Singh et al. |
| 2023/0298410 A1 | 9/2023 | Calmer et al. |
| 2023/0319218 A1* | 10/2023 | Ren ...................... H04N 5/2624 |
| | | 382/284 |
| 2024/0003749 A1 | 1/2024 | Lin et al. |
| 2024/0005678 A1 | 1/2024 | Hassan et al. |
| 2024/0013423 A1 | 1/2024 | Zaheer et al. |
| 2024/0063596 A1 | 2/2024 | Pandian et al. |
| 2024/0146629 A1 | 5/2024 | Lloyd |
| 2025/0002033 A1 | 1/2025 | Calmer et al. |

(56) References Cited

U.S. PATENT DOCUMENTS

FOREIGN PATENT DOCUMENTS

| EP | 1615178 A2 | 1/2006 |
| GB | 2288892 A | 11/1995 |
| WO | WO 2017/123665 A1 | 7/2017 |
| WO | WO 2018/131322 A1 | 7/2018 |
| WO | WO 2019/099409 A1 | 5/2019 |
| WO | WO 2019/125545 A1 | 6/2019 |
| WO | WO 2019/133533 A1 | 7/2019 |
| WO | WO 2023/244513 A1 | 12/2023 |

OTHER PUBLICATIONS

"Cargo Monitor", Samsara Inc., accessed Feb. 21, 2024 [publication date unknown], in 2 pages. URL: https://www.samsara.com/products/models/cargo-monitor.

"Connect your operations on the Samsara Platform.", Samsara Inc., [publication date unknown]. URL: https://www.samsara.com/products/platform/?gad_source=1&gclid=EAIaIQobChMI14DWIofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.

"EM21—Environmental Monitor", Samsara Inc., accessed Feb. 21, 2024 [publication date unknown], in 5 pages. URL: https://www.samsara.com/uk/products/models/em21/.

"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Guide: DRIVE risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https:/keeptruckin.com/dashcam.

"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.

"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle

(56) References Cited

OTHER PUBLICATIONS

Telematics, Fleet Management, and Video-Based Safety Systems, Devices, and Components thereof, Investigation No. 337-TA-3722), in 6 pages.

"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.

"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Transform your business with the Connected Operations™ Cloud", Samsara Inc., accessed Feb. 21, 2024 [publication date unknown], in 8 pages. URL: https://www.samsara.com/products/platform/#impact0.

24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.

Brown, P. et al., "AI Dash Cam Benchmarking" [report], Strategy Analytics, Inc., Apr. 15, 2022, in 27 pages.

Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.

Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.

Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.

Haridas, S., "KeepTruckin Asset Gateway Review", Truck Trailer Tracker, Nov. 16, 2020, in 7 pages. URL: https://trucktrailertracker.com/keeptruckin-asset-gateway-review/.

Horowitz, E. "Improve Fleet Safety with Samsara", Samsara Inc., Aug. 25, 2017, in 4 pages. URL: https://www.samsara.com/ca/blog/improve-fleet-safety-with-samsara/.

Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.

Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.

Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.

Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.

Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.

Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.

Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.

Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.

Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.

Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.

Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.

Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.

Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24, 2023 [publication date unknown], in 3 pages. URL: https://helpcenter.

(56) References Cited

OTHER PUBLICATIONS gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.

Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score.

Motive Help Center, "What is DRIVE Risk Score?", Motive Technologies, Inc., accessed on Oct. 24, 2023 [publication date unknown].

(56)　　　　　　References Cited

OTHER PUBLICATIONS

URL: https://helpcenter.gomotive.com/hc/en-us/articles/6162164321693-What-is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity.

Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub.

Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App.

Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub.

Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors.

Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www.youtube.com/watch?v=jifKM3GT6Bs.

Motive, "Benchmarking AI Accuracy for Driver Safety" [video], YouTube, Apr. 21, 2022, screenshot in 1 page. URL: https://www.youtube.com/watch?v=brRt2h0J80E.

Motive, "CEO Shoaib Makani's email to Motive employees.", Motive Technologies, Inc., Dec. 7, 2022, in 5 pages. URL: https://gomotive.com/blog/shoaib-makanis-message-to-employees/.

Motive, "Coach your drivers using the Motive Safety Hub." [video], YouTube, Mar. 27, 2023, screenshot in 1 page. URL: https://www.youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.

Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.

Motive, "Guide: DRIVE risk score", Motive Technologies, Inc., accessed on Apr. 8, 2023 [publication date unknown], Document No. 2022Q2_849898994, in 22 pages.

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 1 page. URL: https://www.youtube.com/watch?v=WnclRs_cFw0.

Motive, "How to install your Motive AI Dashcam." [video], YouTube, Aug. 5, 2022, screenshot in 1 page. URL: https://www.youtube.com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Improve road and fleet safety with driver scores.", Motive Technologies, Inc., Feb. 7, 2019, in 5 pages. URL: https://gomotive.com/blog/improve-fleet-safety-driver-scores/.

Motive, "Industry-leading fleet management solutions", Motive Technologies, Inc., accessed on Feb. 18, 2024 [publication date unknown], in 13 pages. URL: https://gomotive.com/products/.

Motive, "Introducing an easier way to manage unidentified trips.", Motive Technologies, Inc., Apr. 30, 2020, in 5 pages. URL: https://gomotive.com/blog/introducing-easier-ude-management/.

Motive, "Introducing Motive Driver Workflow.", Motive Technologies, Inc., Oct. 16, 2017, in 5 pages. URL: https://gomotive.com/blog/motive-driver-workflow/.

Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.

Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "KeepTruckin ELD Training for Drivers" [video], YouTube, Feb. 2, 2018, screenshot in 1 page. URL: https://www.youtube.com/watch?v=LKJLIT2bGS0.

Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.

Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.

Motive, "Motive Reefer Monitoring for cold chain logistics." [video], YouTube, Oct. 5, 2022, screenshot in 1 page. URL: https://www.youtube.com/watch?v=rDwS5AmQp-M.

Motive, "Motive Smart Load Board—designed to help you find the right loads faster." [video], YouTube, Nov. 28, 2022, screenshot in 1 page. URL: https://www.youtube.com/watch?v=UF2EQBzLYYk.

(56)         References Cited

OTHER PUBLICATIONS

Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.

Motive, "No time for downtime—automate fleet maintenance schedules" [video], YouTube, Dec. 20, 2022, screenshot in 1 page. URL: https://www.youtube.com/watch?v=flUccP-ifaU.

Motive, "Product Brief: Driver Safety", Motive Technologies, Inc., accessed on Oct. 24, 2023 [publication date unknown], Document No. 2023Q2_1204527735206670, in 4 pages.

Motive, "Product Brief: System Overview", Motive Technologies, Inc., accessed on Oct. 24, 2023 [publication date unknown], Document No. 2022Q4_1203331000367178, in 4 pages.

Motive, "Product Brief: Tracking & Telematics", Motive Technologies, Inc., accessed on Oct. 24, 2023 [publication date unknown], Document No. 2022Q3_1202933457877590, in 4 pages.

Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 7 pages.

Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.

Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.

Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.

Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 16 pages.

Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.

Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.

Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.

Motive, "Spec Sheet: AI Dashcam", Motive Technologies, Inc., accessed on Oct. 24, 2023 [publication date unknown], Document No. 2022Q3_1202788858717595, in 5 pages.

Motive, "Spec Sheet: Asset Gateway", Motive Technologies, Inc., accessed on Mar. 15, 2023 [publication date unknown], Document No. 2022Q1_849551229, in 6 pages.

Motive, "Take control of your fleet with Groups and Features Access.", Motive Technologies, Inc., Apr. 4, 2017, in 3 pages. URL: https://gomotive.com/blog/take-control-fleet-groups-features-access/.

Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.

Motive, "The most accurate AI just got better.", Motive Technologies, Inc., Mar. 8, 2023, in 8 pages. URL: https://gomotive.com/blog/fewer-fleet-accidents-with-the-new-ai/.

Motive, "The Motive Driver App: Change current duty status in your driving log." [video], YouTube, Aug. 10, 2022, screenshot in 1 page. URL: https://www.youtube.com/watch?v=m4HPnM8BLBU.

Motive, "The Motive Driver App: Claim and correct unidentified trips." [video], YouTube, Sep. 13, 2022, screenshot in 1 page. URL: https://www.youtube.com/watch?v=z2_kxd3dRac.

Motive, "The Motive Driver App: Connect to the Vehicle Gateway." [video], YouTube, Sep. 13, 2022, screenshot in 1 page. URL: https://www.youtube.com/watch?v=egZmLYDa3kE.

Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.

Motive, "The Motive Driver App: Digitally record hours of service (HOS)." [video], YouTube, Aug. 10, 2022, screenshot in 1 page. URL: https://www.youtube.com/watch?v=gdexlb_zqtE.

Motive, "The Motive Driver App: Insert past duty driving log status." [video], YouTube, Aug. 10, 2022, screenshot in 1 page. URL: https://www.youtube.com/watch?v=TmOipFKPBeY.

Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.

Motive, "The Motive Driver App: View hours of service (HOS) violations." [video], YouTube, Aug. 10, 2022, screenshot in 1 page. URL: https://www.youtube.com/watch?v=qJX2ZiBGtV8.

Motive, "U.S. speed limits. What drivers and fleets need to know.", Motive Technologies, Inc., Jan. 13, 2022, in 8 pages. URL: https://gomotive.com/blog/us-speed-limits-for-drivers/.

Motive, "What is an AI dashcam?", Motive Technologies, Inc., Jan. 21, 2022, in 6 pages. URL: https://gomotive.com/blog/what-is-ai-dashcam/.

Motive, "WiFi Hotspot sets you free from restrictive cell phone data plans.", Motive Technologies, Inc., Jun. 27, 2019, in 5 pages. URL: https://gomotive.com/blog/wifi-hotspot/.

Motive, "WiFi Hotspot", Motive Technologies, Inc., accessed on Feb. 18, 2024 [publication date unknown], in 5 pages. URL: https://gomotive.com/products/wifi-hotspot/.

Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.

Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

(56)        References Cited

OTHER PUBLICATIONS

Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm45856414558016332384295787 04 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
Driver I, The Power of Vision, Netradyne, [publication date unknown], in 2 pages.
"Driver Speed Management for Fleets—Monitoring Speeding in your fleet to increase safety and lower costs", Lytx, 2018, in 9 pages. URL: https://web.archive.org/web/20181217230050/https:/www.lytx.com/en-us/fleet-services/program-enhancements/speed-management-for-fleets.
"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"EcoDrive", Wikipedia, 2022, in 1 page. URL: https://en.wikipedia.org/wiki/EcoDrive.
"Fiat 500—2015 Owner's Manual", FCA US LLC, 2016, 5th ed., in 440 pages.

"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Fiat launches fleet-specific eco: Drive system", Fleet World, 2010, in 3 pages. URL: https://fleetworld.co.uk/fiat-launches-fleet-specific-ecodrive-system/.
"Introduction Pack", Drivecam, Inc., 2012, in 32 pages. URL: https://www.iae-services.com.au/downloads/DriveCam-Introduction-Pack.pdf.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.
"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.
"Making roads safer for everyone, everywhere", Light Metrics, 2023, in 8 pages. URL: https://www.lightmetrics.co/about-us.
"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.
"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.
"Nauto—Getting Started", Manualslib, Nauto, Inc., Apr. 20, 2017, in 18 pages. URL: https://www.manualslib.com/manual/1547723/Nauto-Nauto.html.
"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.
"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.
"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.
"NetraDyne, an Artificial Intelligence Leader, Launches Driver-i™, a Vision-Based Platform, Focusing on Commercial Vehicle Driver Safety", Netradyne, [publication date unknown], in 2 pages.
"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daab c63d4a307cfd3dcb.pdf.
"Sensor Fusion: Building the Bigger Picture of Risk", Lytx, Apr. 12, 2019, in 1 page. URL: https://www.lytx.com/newsletter/sensor-fusion-building-the-bigger-picture-of-risk.
"The 2012 Fiat 500: eco:Drive", Fiat500USA.com, Feb. 14, 2011, in 24 pages. URL: http://www.fiat500usa.com/2011/02/2012-fiat-500-ecodrive.html.
"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.
"What is a ter-a-flop?", netradyne.com, [publication date unknown], in 2 pages.

(56) References Cited

OTHER PUBLICATIONS

"Vezo 360 Dash Cam—Capture Every Single Angle in Crisp Detail", ArVizon, 2019, in 13 pages. URL: https://www.arvizon.com/vezo-360-dash-cam/.

"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.

"The Home of Actionable Transportation Insights—Meet Altitude", Geotab ITS, accessed on Apr. 1, 2024 [publication date unknown], in 5 pages. URL: https://its.geotab.com/altitude/.

Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.

Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.

Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.

AutoMotoTv, "Fiat ecoDrive System" [video], YouTube, Oct. 6, 2008, screenshot in 1 page URL: https://www.youtube.com/watch?v=AUSb2dBBI8E.

Batchelor, B. et al., "Vision Systems on the Internet", Proc. SPIE 6000, Two- and Three-Dimensional Methods for Inspection and Metrology III, Nov. 2005, vol. 600003, in 15 pages.

Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.

Bendix, "Bendix® Wingman® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.

Bendix, "Quick Reference Catalog", Bendix Commercial Vehicle Systems LLC, 2018, in 165 pages. URL: https://www.bendix.com/media/home/bw1114_us_010.pdf [uploaded in 2 parts].

Bergasa, L. M. et al., "DriveSafe: an App for Alerting Inattentive Drivers and Scoring Driving Behaviors", IEEE Intelligent Vehicles Symposium (IV), Jun. 2014, in 7 pages.

Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.

Camillo, J., "Machine Vision for Medical Device Assembly", Assembly, Mar. 3, 2015, in 5 pages. URL: https://www.assemblymag.com/articles/92730-machine-vision-for-medical-device-assembly.

Camillo, J., "Machine Vision for Medical Device Assembly", Assembly, Mar. 3, 2015, in 5 pages.

Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.

Chauhan, V. et al., "A Comparative Study of Machine Vision Based Methods for Fault Detection in an Automated Assembly Machine", Procedia Manufacturing, 2015, vol. 1, pp. 416-428.

Chiou, R. et al., "Manufacturing E-Quality Through Integrated Web-enabled Computer Vision and Robotics", The International Journal of Advanced Manufacturing Technology, Aug. 2009, vol. 43, in 19 pages.

Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.

Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.

Cordes, C., "Ask an Expert: Capturing Fleet Impact from Telematics", Mckinsey & Co., Jun. 13, 2017, in 3 pages. URL: https://www.mckinsey.com/capabilities/operations/our-insights/ask-an-expert-capturing-fleet-impact-from-telematics.

D'Agostino, C. et al., "Learning-Based Driving Events Recognition and Its Application to Digital Roads", IEEE Transactions on Intelligent Transportation Systems, Aug. 2015, vol. 16(4), pp. 2155-2166.

Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.

Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.

Dunn, B., "What is the Lytx DriveCam?", Autobytel, Jul. 12, 2014, in 1 page. URL: https://www.autobytel.com/what-is-lytx-drivecam.

Ekström, L., "Estimating fuel consumption using regression and machine learning", KTH Royal Institute of Technology, Degree Project in Mathematics, 2018, in 126 pages.

Engelbrecht, J. et al., "A Survey of Smartphone-based Sensing in Vehicles for ITS Applications", IET Intelligent Transport Systems, Jul. 2015, vol. 9(10), in 23 pages.

Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.

FiatFranco, ""Ciao!"—Fiat ecoDrive" [video], YouTube, Sep. 10, 2007, screenshot in 1 page URL: https://www.youtube.com/watch?v=SluE9Zco55c.

Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.

Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.

Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.

Gilman, E. et al., "Personalised assistance for fuel-efficient driving", Transportation Research Part C, Mar. 2015, pp. 681-705.

Ginevra2008, "Fiat EcoDrive" [video], YouTube, Mar. 7, 2008, screenshot in 1 page. URL: https://www.youtube.com/watch?v=D95p9Bljr90.

Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.

Groover, M. P., "Chapter 22 Inspection Technologies", in Automation, Production Systems, and Computer-Integrated Manufacturing, 2015, 4th Edition, Pearson, pp. 647-684.

Groover, M. P., *Automation, Production Systems, and Computer-Integrated Manufacturing*, 2016, 4th Edition (Indian Subcontinent Adaptation), Pearson, in 11 pages.

Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.

Han, Z. et al., "Design of Intelligent Road Recognition and Warning System for Vehicles Based on Binocular Vision", IEEE Access, Oct. 2018, vol. 6, pp. 62880-62889.

Haworth, N. et al., "The Relationship between Fuel Economy and Safety Outcomes", Monash University, Accident Research Centre, Dec. 2001, Report No. 188, in 67 pages.

(56)　　　　　References Cited

OTHER PUBLICATIONS

Horsey, J., "VEZO 360 4K 360 dash cam from $149", Geeky Gadgets, Apr. 3, 2019, in 12 pages. URL: https://www.geeky-gadgets.com/vezo-360-4k-360-dash-cam-03-04-2019/.

Huang, K.-Y. et al., "A Novel Machine Vision System for the Inspection of Micro-Spray Nozzle", Sensors, Jun. 2015, vol. 15(7), pp. 15326-15338.

Huff, A., "Lytx DriveCam", CCJDigital, Apr. 4, 2014, in 12 pages. URL: https://www.ccjdigital.com/business/article/14929274/lytx-drivecam.

Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.

Junior, J. F. et al., "Driver behavior profiling: An investigation with different smartphone sensors and machine learning", PLoS One, Apr. 2017, vol. 12(4): e0174959, in 16 pages.

Kwon, Y. J. et al., "Automated Vision Inspection in Network-Based Production Environment", International Journal of Advanced Manufacturing Technology, Feb. 2009, vol. 45, pp. 81-90.

Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.

Lekach, S., "Driver safety is 'all talk' with this AI real-time road coach", Mashable, Aug. 3, 2018, in 11 pages. URL: https://mashable.com/article/netradyne-driveri-ai-driver-safety.

Lotan, T. et al., "In-Vehicle Data Recorder for Evaluation of Driving Behavior and Safety", Transportation Research Record Journal of the Transportation Research Board, Jan. 2006, in 15 pages.

Lytx, "TeenSafe Driver Program", American Family Insurance®, 2014, in 10 pages. URL: https://online-sd02.drivecam.com/Downloads/TSD_WebsiteGuide.pdf.

Malamas, Elias N. et al. "A survey on industrial vision systems, applications and tools", Image and Vision Computing, Dec. 28, 2002, vol. 21, pp. 171-188.

Meiring, G. et al., "A Review of Intelligent Driving Style Analysis Systems and Related Artificial Intelligence Algorithms", Sensors, Dec. 2015, vol. 15, pp. 30653-30682.

Mitrovic, D. et al., "Reliable Method for Driving Events Recognition", IEEE Transactions on Intelligent Transportation Systems, Jun. 2005, vol. 6(2), pp. 198-205.

Motive, "Guide: AI Model Development", Motive Technologies, Inc., accessed on Mar. 29, 2024 [publication date unknown], Document No. 2022Q1_849898994, in 14 pages.

Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.

Nauto, "How Fleet Managers and Safety Leaders Use Nauto" [video], YouTube, Jan. 25, 2018, screenshot in 1 page. URL: https://www.youtube.com/watch?v=k_iX7a6j2-E.

Nauto, "The New World of Fleet Safety—Event Keynote" [video], YouTube, Jul. 9, 2020, screenshot in 1 page. URL: https://www.youtube.com/watch?v=iMOab9Ow_CY.

Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.

Netradyne India, "Netradyne Driveri Covered in BBC Click" [video], YouTube, Jan. 25, 2018, screenshot in 1 page. URL: https://www.youtube.com/watch?v=jhULDLj9iek.

Netradyne presentation, Netradyne, Oct. 2016, in 23 pages.

Netradyne, "Driver•i™ Catches No Stop ad Stop Sign | Fleet Management Technology" [video], YouTube, Oct. 3, 2017, screenshot in 1 page. URL: https://www.youtube.com/watch?v=I8sX3X02aJo.

Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.

Netradyne, Driver Card 1, 2018, in 2 pages.

Netradyne, Driver Card 2, 2018, in 2 pages.

Ohidan, A., "Fiat And AKQA Launch Eco:Drive™", Science 2.0, Oct. 7, 2008, in 4 pages. URL: https://www.science20.com/newswire/fiat_and_akqa_launch_eco_drive_tm.

Perez, L. et al., "Robot Guidance Using Machine Vision Techniques in Industrial Environments: A Comparative Review", Sensors, Mar. 2016, vol. 16(3), in 27 pages.

Puckett, T. et al. "Safety Track 4B—Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.

Ramkumar, S. M. et al., "Chapter 14 Web Based Automated Inspection and Quality Management", in Web-Based Control and Robotics Education, 2009, ed., Spyros G. Tzafestas, Springer, in 42 pages.

Tzafestas, S. G. (ed.), Web-Based Control and Robotics Education, 2009, Springer, ISBN 978-90-481-2504-3, in 362 pages. [uploaded in 3 parts].

Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.

Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.

Soumik Ukil, "LightMetrics ADAS demo" [video], YouTube, Jul. 20, 2017, screenshot in 1 page. URL: https://www.youtube.com/watch?app=desktop&v=9LGz1oo7dTw.

Steger, C. et al., "Chapter 2 Image Acquisition" and "Chapter 3 Machine Vision Algorithms", in Machine Vision Algorithms and Applications, 2018, 2nd ed., Wiley, in 604 pages.

Steger, C. et al., Machine Vision Algorithms and Applications, 2018, 2nd ed., Wiley, in 60 pages.

Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.

Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.

Su, C.-C. et al., "Bayesian depth estimation from monocular natural images", Journal of Vision, 2017, vol. 17(5):22, pp. 1-29.

Sung, T.-W. et al., "A Speed Control Scheme of Eco-Driving at Road Intersections", 2015 Third International Conference on Robot, Vision and Signal Processing, 2015, pp. 51-54.

Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.

The Wayback Machine, "AT&T Fleet Complete—Give your Business a competitive advantage", AT&T, 2019, in 12 pages. URL: https://web.archive.org/web/20190406125249/http:/att.fleetcomplete.com/.

The Wayback Machine, "Introducing Driver—I™", NetraDyne, Sep. 22, 2016, in 4 pages URL: https://web.archive.org/web/20160922034006/http://www.netradyne.com/solutions.html.

The Wayback Machine, "NetraDyne's Driver—I ™ platform delivers results beyond legacy safety video systems Counting safe driving as safe driving—taking second-guessing out of commercial

(56)                     References Cited

OTHER PUBLICATIONS fleet driver safety", NetraDyne, Feb. 9, 2018, in 7 pages. URL: https://web.archive.org/web/20180209192736/http:/netradyne.com/solutions/.

Top Fives, "15 Biggest Data Centers on Earth" [video], YouTube, Jun. 9, 2024, screenshot in 1 page. URL: https://www.youtube.com/watch?v=1LmFmCVTppo.

Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.

Vezo 360, "World's Smartest Dash Cam Powered by AI" [video], YouTube, Mar. 31, 2019, screenshot in 1 page. URL: https://www.youtube.com/watch?v=M5r5wZozS0E.

Vlahogianni, E. et al., "Driving analytics using smartphones: Algorithms, comparisons and challenges", Transportation Research Part C, Jun. 2017, vol. 79, pp. 196-206.

Wahlstrom, J. et al., "Smartphone-based Vehicle Telematics—A Ten-Year Anniversary", IEEE Transactions on Intelligent Transportation Systems, Nov. 2016, vol. 18(10), in 23 pages.

Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.

Yufeng, Z. et al., "3G-Based Specialty Vehicles Real-Time Monitoring System", Applied Mechanics and Materials, Feb. 2014, vols. 513-517, pp. 871-875.

Yufeng, Z. et al., "3G-Based Specialty Vehicles Real-Time Monitoring System", Applied Mechanics and Materials, Feb. 2014, vols. 513-517, pp. 871-875, in 7 pages.

Zanini, M. et al., "Mobile Assets Monitoring for Fleet Maintenance", SAE International, Apr. 11-14, 2005, in 9 pages.

Zanini, M. et al., "Mobile Assets Monitoring for Fleet Maintenance", SAE International, 2005, pp. 369-375, in 8 pages.

Zhong, R. Y. et al., "Intelligent Manufacturing in the Context of Industry 4.0: A Review", Engineering, Oct. 2017, vol. 3, Issue 5, pp. 616-630.

"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).

"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.

"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.

"Fuelopps" [archived webpage], Propel It, archived on Nov. 14, 2017, in 3 pages. URL: https://web.archive.org/web/20171114184116/http://www.propelit.net:80/fuelopps2.

"Fuelopps", Propel It, [publication date unknown], in 1 page. (PROPEL-IT-1393_00001).

"FuelOpps™ Delivers for Covenant Transportation Group—Improved driver behavior contributes to a 3+% MPG improvement in less than 12 months", FuelOpps by Propel IT, [publication date unknown], in 2 pages.

"FuelOpps™ Version 2.0" [presentation], Propel IT, Inc., [publication date unknown], in 17 pages.

"Our Products" [archived webpage], Propel It, archived on Aug. 3, 2018, in 2 pages. URL: https://web.archive.org/web/20180803052120/http://www.propelit.net:80/our-products-1.

"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).

"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).

"Safetyopps" [archived webpage], Propel It, archived on Nov. 14, 2017, in 3 pages. URL: https://web.archive.org/web/20171114183538/http://www.propelit.net:80/safetyopps2.

"Safetyopps", Propel It, [publication date unknown], in 1 page. (PROPEL-IT-1393_00019).

Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.

Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).

* cited by examiner

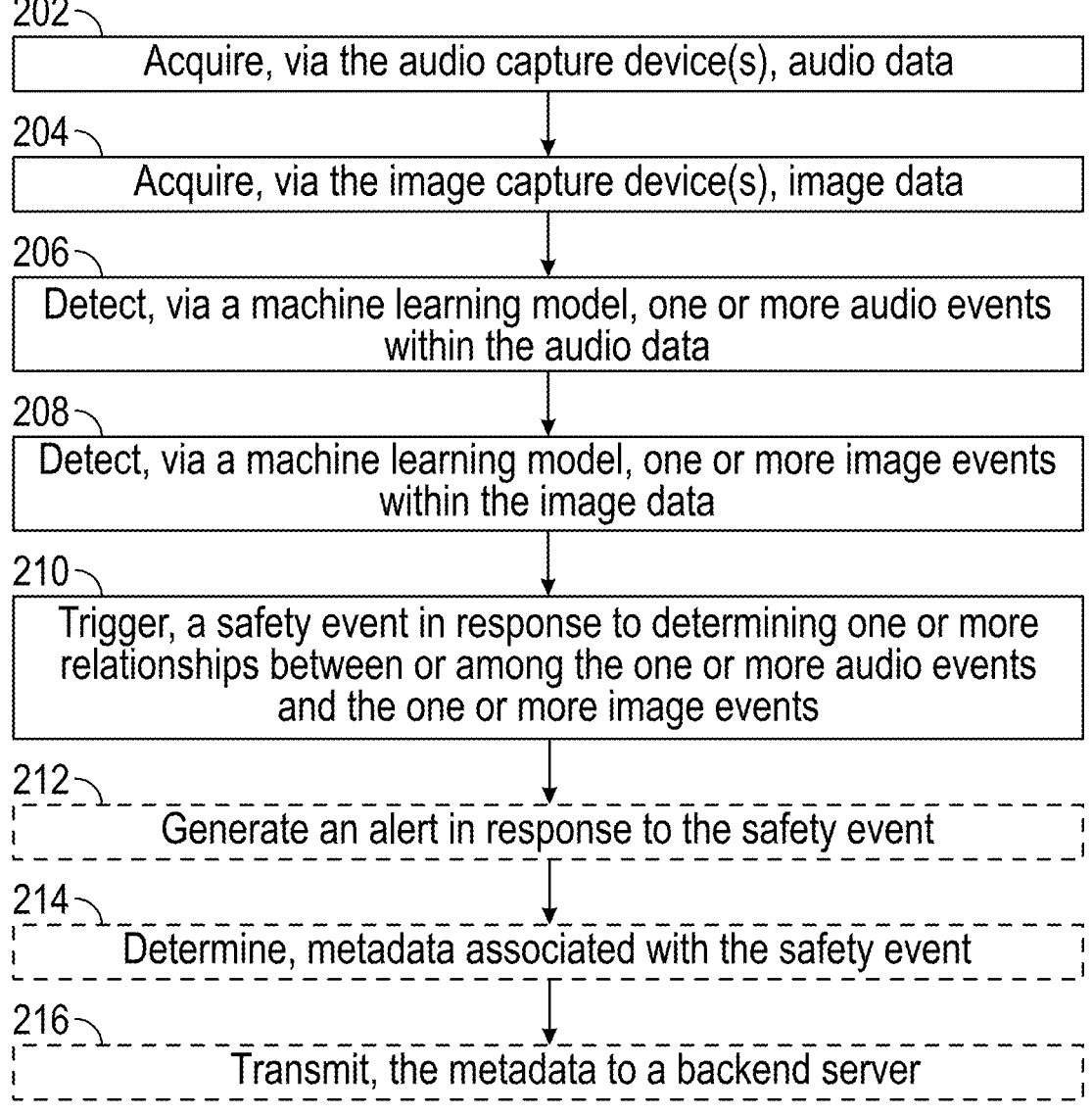

202

Acquire, via the audio capture device(s), audio data

204

Acquire, via the image capture device(s), image data

206

Detect, via a machine learning model, one or more audio events within the audio data

208

Detect, via a machine learning model, one or more image events within the image data

210

Trigger, a safety event in response to determining one or more relationships between or among the one or more audio events and the one or more image events

212

Generate an alert in response to the safety event

214

Determine, metadata associated with the safety event

216

Transmit, the metadata to a backend server

FIG. 2A

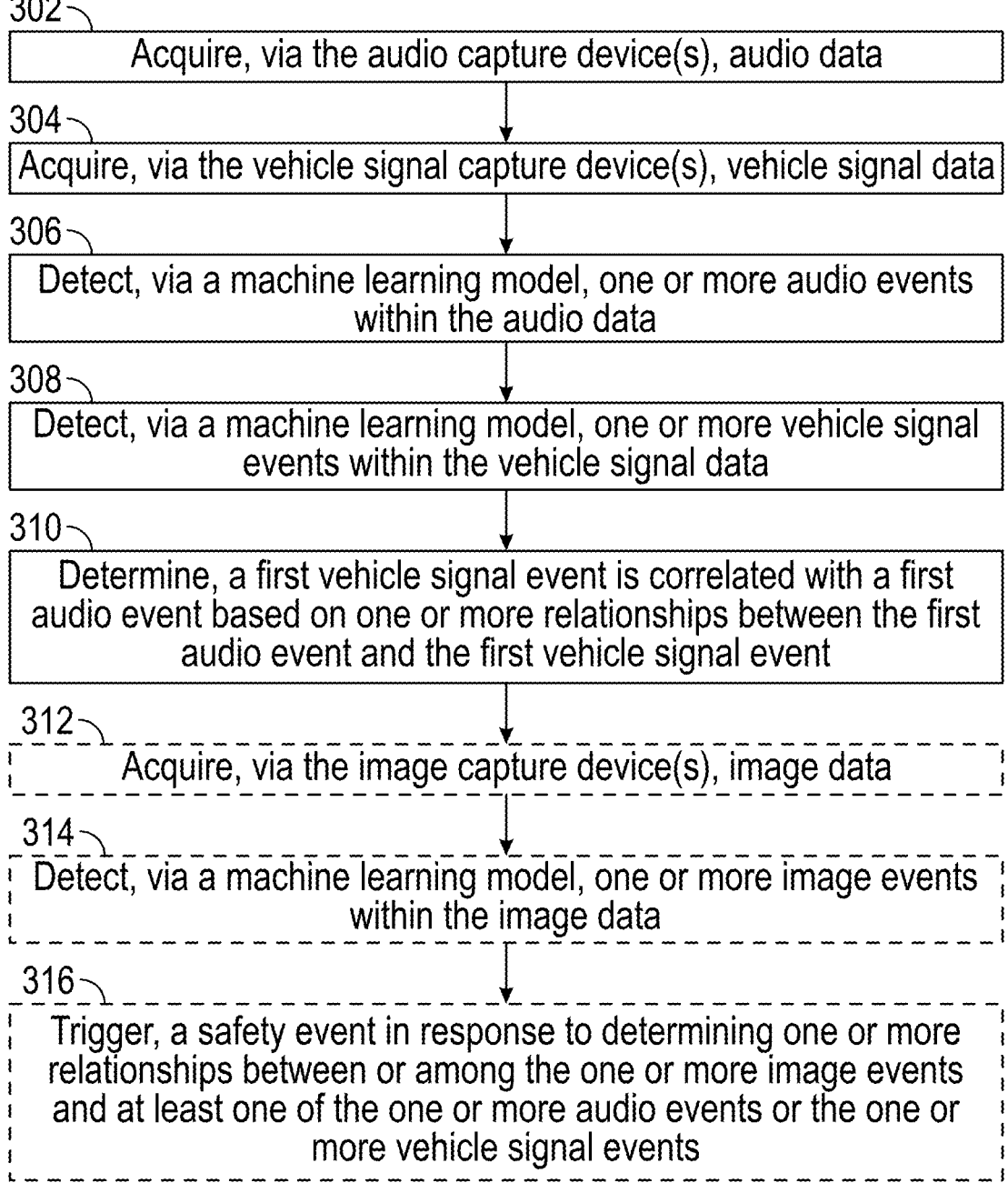

302

Acquire, via the audio capture device(s), audio data

304

Acquire, via the vehicle signal capture device(s), vehicle signal data

306

Detect, via a machine learning model, one or more audio events within the audio data

308

Detect, via a machine learning model, one or more vehicle signal events within the vehicle signal data

310

Determine, a first vehicle signal event is correlated with a first audio event based on one or more relationships between the first audio event and the first vehicle signal event

312

Acquire, via the image capture device(s), image data

314

Detect, via a machine learning model, one or more image events within the image data

316

Trigger, a safety event in response to determining one or more relationships between or among the one or more image events and at least one of the one or more audio events or the one or more vehicle signal events

FIG. 2B

402 —
Acquire, via the audio capture device(s), audio data

404 —
Detect, via a machine learning model, one or more audio events within the audio data 406 —
Trigger, a safety event in response to detecting the one or more audio events

VEHICLE DEVICE WITH SAFETY ALERT SYSTEM

TECHNICAL FIELD

Implementations of the present disclosure relate to devices, systems, and methods that can provide real-time safety event detection within a vehicle using received image and audio data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The occurrence of road accidents due to, for example, unsafe lane changes and departures is a significant concern. Lane departure systems may alert drivers of unintentional lane departures. However, various types of intentional and unintentional actions taken by drivers results in significant losses and injury on an annual basis.

SUMMARY

The systems, methods, and devices described herein each have several aspects, no single one of which is solely responsible for its desirable attributes. Without limiting the scope of this disclosure, several non-limiting features will now be described briefly.

As noted above, the occurrence of road accidents due to, for example, unsafe lane changes and departures is a significant concern. Lane departure systems may monitor lane markings and the vehicle's relative position to the lane markings to alert drivers of unintentional lane departures. Driver intent can be gained through turn signal activation, however, not all vehicles are capable of providing turn signal information. Thus, real-time lane departure alerts are not available for all makes, models, and types of vehicles.

According to various implementations, the present disclosure describes an improved vehicle device (e.g., a dash cam) that can execute an event model. The vehicle device can provide alerts (including real-time alerts) of detected safety events, such as vehicle lane departures and changes without an activated turn signal and/or other events of interest. The vehicle device can be installed into existing vehicles and can provide real-time alerts based on processing of audio data and/or video data from one or more microphones and one or more cameras. The safety event detection can be performed local to the vehicle device (e.g., the dash cam) without transmitting data to a backend server for processing, so that the alerts can be immediately actionable by the vehicle driver in reducing frequency and severity of accidents.

Various implementations of the present disclosure provide improvements to various technologies and technological fields, and practical applications of various technological features and advancements. For example, as described above, existing lane departure systems are limited in various ways, and various implementations of the present disclosure provide significant improvements over such technology, and practical applications of such improvements. Additionally, various implementations of the present disclosure are inextricably tied to, and provide practical applications of, computer technology. In particular, various implementations rely on detection of user inputs via graphical user interfaces, operation and configuration of machine vision devices, automatic processing of audio data, image data, and vehicle signal data. Such features and others are intimately tied to, and enabled by, computer and machine vision technology, and would not exist except for computer and machine vision technology.

Additional implementations of the disclosure are described below in reference to the appended claims, which may serve as an additional summary of the disclosure.

In various implementations, systems and/or computer systems are disclosed that comprise one or more computer-readable storage mediums having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising one or more computer-readable storage mediums are disclosed, wherein the computer-readable storage mediums have program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 2A-2C are flow diagrams illustrating example processes for the vehicle device to detect safety events;

DETAILED DESCRIPTION

Figure 1A:
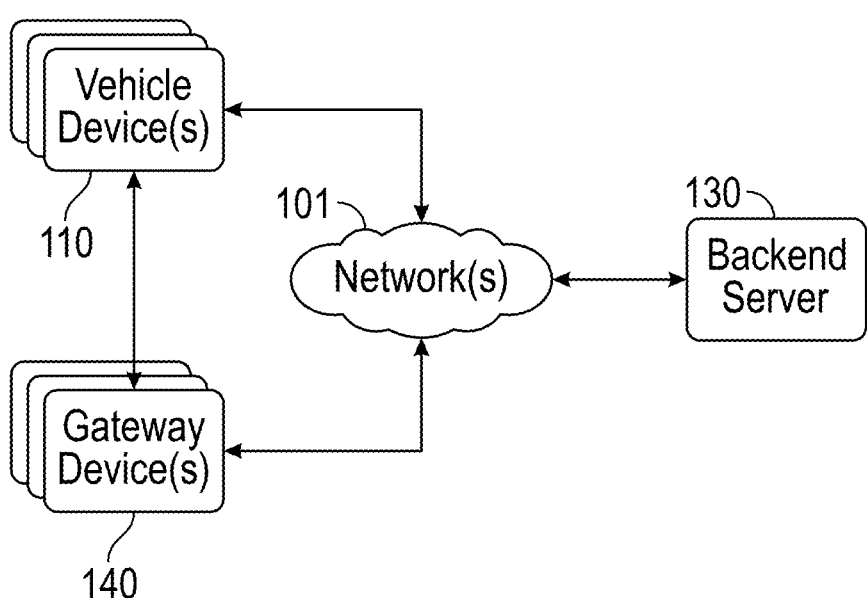
FIG. 1A illustrates an example backend server in communication with one or more vehicle devices and one or more gateway devices.

Although certain preferred implementations and examples are disclosed below, inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Overview

According to various implementations, the present disclosure describes an improved vehicle device (e.g., a dash cam) that can execute an event model. The vehicle device can provide alerts (including real-time alerts) of detected safety events, such as vehicle lane departures and changes without an activated turn signal and/or other events of interest. The vehicle device can be installed into existing vehicles and can provide real-time alerts based on processing of audio data and/or video data from one or more microphones and one or more cameras. The safety event detection can be performed local to the vehicle device (e.g., the dash cam) without transmitting data to a backend server for processing, so that the alerts can be immediately actionable by the vehicle driver in reducing frequency and severity of accidents.

In some implementations, the vehicle device is configured to execute one or more event models (e.g., neural networks, machine learning models, artificial intelligence models, program logic, and/or the like), such as based on input from one or more of the microphones, cameras, and/or other sensors associated with the vehicle device and/or other devices, to intelligently detect safety events. The vehicle device can include logic for determining which data to transmit to a backend server in response to detection of a safety event, as well as which data to transmit to the backend server in response to analysis of data that did not trigger a safety event.

In some implementations, the backend server may have context and perspective that individual vehicle devices do not have. For example, the backend server may include data associated with a large quantity of vehicles, such as vehicles across a fleet or within a geographic area. Thus, the backend server may perform analysis of data across multiple vehicles, as well between groups of vehicles (e.g., comparison of fleets operated by different entities). The backend server can use uploaded data to optimize for both customer experience and data transfer quantity. For example, using metadata from a safety event (whether a false or positive safety event), the backend server can make an informed go/no-go decision on whether a particular event should be shown in a safety dashboard or whether it may be a false positive. The backend server may then decide whether data associated with the safety event should be transmitted to a user device associated with the backend server, for example only if the detected event is a positive event or an event meeting certain criteria. Thus, the amount of data transmitted to the user device may be largely reduced, while maintaining the ability for the backend server to obtain as much data as needed to improve the event models (e.g., the machine learning models that are executed on the vehicle device), further analyze asset data for applicability of safety events, and transmit corresponding alerts to the user device. The backend server may also include a feedback system that periodically updates machine learning models used by vehicle devices to provide immediate in-vehicle alerts, such as when the backend server has optimized an event model based on analysis of data associated with many safety events, potentially across multiple fleets of vehicles.

As noted above, various implementations of the present disclosure provide improvements to various technologies and technological fields, and practical applications of various technological features and advancements. For example, as described above, existing lane departure systems are limited in various ways, and various implementations of the present disclosure provide significant improvements over such technology, and practical applications of such improvements. Additionally, various implementations of the present disclosure are inextricably tied to, and provide practical applications of, computer technology. In particular, various implementations rely on detection of user inputs via graphical user interfaces, operation and configuration of machine vision devices, automatic processing of audio data, image data, and vehicle signal data. Such features and others are intimately tied to, and enabled by, computer and machine vision technology, and would not exist except for computer and machine vision technology.

To facilitate an understanding of the systems and methods discussed herein, several terms are described herein. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

A Vehicle Device is an electronic device that includes and/or communicates with one or more sensors positioned on or in a vehicle, and/or that communicates with one or more vehicle systems or aspects. A vehicle device may include sensors such as one or more video sensors, audio sensors, accelerometers, global positioning system ("GPS") sensors, and/or the like. Vehicle devices can include communication circuitry configured to transmit event data to a backend server. Vehicle devices can also include memory for storing software code that is usable to execute one or more event models that allow the vehicle device to trigger events without communication with the backend server. In some implementations, the vehicle device may include and/or operate in conjunction with a gateway device.

A Gateway Device is an electronic device that enables communication with an electronic control unit ("ECU") and/or other systems of a vehicle. Gateway devices, also referred to herein as "vehicle gateway devices", can include communication circuitry configured to transmit data to the vehicle device and/or the backend server. Gateway devices can communicate with ECUs, vehicle systems, vehicle devices, and/or the like, via wired or wireless connection.

An Event of Interest (also referred to herein as an "event") is a circumstance of interest to a safety manager, fleet administrator, vehicle driver, and/or others. Events may be identified based on various combinations of characteristics associated with one or more vehicles, for example. For example, an event associated with a vehicle may indicate a safety concern, such as a vehicle lane change or departure being made without an activated turn signal.

An Audio Event is an event that indicates audio data of interest, such as a turn signal sound, has been received by a sensor of the vehicle device.

An Image Event is an event that indicates image data of interest, such as a vehicle's position relative to one or more traffic lanes, has been received by a sensor of the vehicle device.

A Vehicle Signal Event is an event that indicates vehicle signal data of interest, such as a vehicle signal that indicates a turn signal is activated in the vehicle, has been received by a sensor of the vehicle device.

A Safety Event is any event that indicates, for example, a vehicle action is occurring or has occurred, such as a lane change, based on or more relationship between audio event(s), image event(s), and/or vehicle signal event(s).

An Event Model is a set of logic that may be applied to asset data (e.g., audio data, image data, vehicle signal data, and/or the like) to determine when an event is occurring or has occurred. An event model may be, for example, an algorithm, statistical model, neural network, machine leaning model, and/or the like, that takes as input one or more types of asset data. An event model (also sometimes referred to herein as a "machine learning model") may be stored in any format, such as a list of criteria, rules, thresholds, and the like, that indicate occurrence of an event. Event models may be executed by a vehicle device, gateway device, and/or by a backend server (e.g., in the cloud).

Sensor Data can include any data obtained by the vehicle device, such as asset data and metadata.

Asset Data can include any data associated with a vehicle and/or driver of the vehicle, such as data that is usable by an event model to indicate whether a safety event is occurring or has occurred. Asset data may include audio data, image data (e.g., video data and/or files, still images), vehicle signal data, and/or other data.

Event Data can include any data associated with an event, such as a set of sensor data (e.g., metadata and/or asset data) received or obtained by the vehicle device within a window of time in which the safety event occurred (e.g., a time period occurring immediately before and/or immediately after the detected safety event). For example, event data may include image data and/or audio data that is trimmed to a default length by the vehicle device for uploading to the backend server (e.g., 3 seconds before and 3 seconds after the detected safety event) and/or may be selected based on rules associated with the detected event. Event data can be reviewed by a user (e.g., a fleet manager) to quickly assess a detected safety event.

Metadata can include data that provides information regarding a detected event, typically in a more condensed manner than the related asset data. Metadata may include, for example, accelerometer data, GPS data, ECU data, vehicle speed data, forward camera object tracking data, inward (driver)-facing camera data, and/or any other related data. Metadata may also include information such as event keys and other identification information, event type, event date and time stamps, event location, and the like.

Features can include any "interesting" part of sensor data, such as data that is extracted from and/or derived from sensor data and may provide an abstraction of the sensor data. Event models may identify features, such as those that are useful in triggering a safety event. Features may include items (and/or metadata associated with those Items) such as objects within images obtained by one of the cameras of the dash cam. Other examples of features may include objects in images, other vehicle metadata, such as GPS, acceleration, and the like.

A Data Store is any computer-readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

A Database is any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, extensible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the Figures of the present application) is to be understood as being stored in one or more data stores. Additionally, although the present disclosure may show or describe data as being stored in combined or separate databases, in various implementations such data may be combined and/or separated in any appropriate way into one or more databases, one or more tables of one or more databases, etc. As used herein, a data source may refer to a table in a relational database, for example.

Example Event Models

As is discussed further herein, the vehicle device and/or the backend server may implement certain event models (e.g., including machine learning techniques) that are configured to identify features within sensor data and/or asset data, such as audio detected by one or more microphones of the vehicle device, in images from one or more of cameras of the vehicle device, metadata from other sensors, and the like. The feature detection may be performed by an event model (e.g., part of the vehicle device and/or the backend server), which may include program code executable by one or more processors to analyze audio data, video data, and/or other sensor data (e.g., motion sensors, positioning sensor, and/or the like). While some of the discussion herein is with reference to analysis of audio and video data, such discussions should be interpreted to also cover analysis of any other type of data, such as any sensor data.

In some implementations, the vehicle device can process audio data locally to identify various associated features, such as detection of sounds (e.g., a turn signal noise) within audio files. In some implementations, the vehicle device can process video data locally to identify various associated features, such as detection of an object (e.g., a vehicle, road markings), characteristics of the object (e.g., speed, distance, dimensions, and/or the like), location of the object within the image files of the video, and/or the like. This feature data comprises metadata, which can be indexed (e.g., to a corresponding audio recording, video recording, and/or video feed) to track the time ranges that each detection begins and ends in audio and video data. Such metadata, and other optimized data, can then be analyzed by event models executing on the vehicle device and/or selectively transmitted to the backend server.

In some implementations, the event models can be implemented by a machine learning component (e.g., executed by the vehicle device and/or backend server) that can be used to assist in detection of safety events, such as in real-time at the vehicle device. For example, the machine learning component can implement the event models that are executed by a processor (e.g., in the vehicle device and/or the backend server). In some implementations, the machine learning component can use one or more machine learning algorithms to generate one or more models or parameter functions for the detections. The machine learning component can be configured to generate an event model that understands which types of data indicate which types of detections. One or more of these event models may be used to determine an expected value or occurrence based on analysis of received data. In some implementations, audio recording and/or video recording criteria ("criteria") (e.g., pre-configured video recording criteria) can be designated by a user, admin, or automatically. For example, the criteria can indicate which types of detected features to monitor, record, or analyze. By designating specific types of detections, resources (e.g., processing power, bandwidth, etc.) can be preserved for only the types of feature detections desired.

Various types of algorithms may be used by the machine learning component to generate the event models (e.g., that perform feature detection and related event detection). For example, certain implementations herein may use a logistical regression model, decision trees, random forests, convolutional neural networks, deep networks, or others. However, other event models are possible, such as a linear regression model, a discrete choice model, or a generalized linear model. The machine learning algorithms can be configured to adaptively develop and update the event models over time based on new input received by the machine learning component. For example, the event models executed by the vehicle device may be regenerated on a periodic basis (e.g., by the backend server) as new received data is available to help keep the predictions in the event model more accurate as the data is collected over time. Also, for example, the event models may be regenerated based on configurations received from a user or management device associated with the backend server.

Some non-limiting examples of machine learning algorithms that can be used to generate and update event models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, copious amounts (such as terabytes or petabytes) of received data may be analyzed to generate models without manual analysis or review by one or more people.

Example Vehicle Device and Backend Server

FIG. 1A illustrates one or more vehicle device(s) 110 in communication with a backend server 130. In some implementations, each vehicle device 110 can also be in communication with a gateway device 140. In other implementations, each vehicle device 110 can include a gateway device 140. The vehicle device 110 can be configured to be secured to or positioned inside or outside of a vehicle. Vehicle, as the term is used herein, is intended to be a broad term that encompasses a wide range of devices that can be used for, for example, transporting goods and/or people. The vehicle device 110 may physically incorporate, be coupled to, and/or be in communication with (e.g., via wired or wireless communication channel) a plurality of sensors, such as, for example, one or more audio capture devices 114 and one or more image capture device 116, described with reference to FIG. 1B. In some implementations, the vehicle device 110 comprises a dash cam, such as the example dash cam illustrated in FIG. 1C. In other implementations, the vehicle device 110 may include other components.

The vehicle device 110 can store received and/or processed data in a memory of the vehicle device 110 (e.g., a computer-readable storage medium). The vehicle device 110 further includes one or more microprocessors and communication circuitry that can be configured to transmit data to the backend server 130, such as via one or more networks 101. In particular, the vehicle device 110 can transmit the received and/or processed data, such as event data, to the backend server 130. As another example, the vehicle device 110 can transmit an alert to the backend server 130. The backend server 130 may thereby receive data from multiple vehicle devices 110 and may aggregate and perform further analyses on the received data from the vehicle devices 110. In some implementations, the vehicle device 110 can receive updates from the backend server 130. In some examples, a dashboard may be generated on the backend server 130 or a user device associate with the backend server 130 to illustrate event data from the vehicle device 110, such as via an online portal, e.g., a website or standalone application. The backend server 130 may be operated, for example, by a fleet/safety manager that reviews information regarding triggered safety events associated with a fleet of drivers/vehicles, each including a vehicle device 110.

The vehicle device 110 may include or be in communication (e.g., wired or wireless) with a gateway device 140. In general, the gateway device 140 can comprise a housing including processor(s), memory, input/output ports, etc. that may be connected to components of a vehicle. For example, the gateway device 140 can interface with a vehicle bus of the vehicle. In particular, the gateway device 140 can connect to the vehicle bus of the vehicle 110 over an interface, such as, but not limited to, OBD-II or J1939. The gateway device 140 can receive and/or process data received via the interfaces of the gateway device 140. In some implementations, the gateway device 140 can execute one or more event models to process data received by the gateway device 140, such as vehicle signal data. The gateway device 140 can include or be configured to be an electronic logging device (ELD). Accordingly, the gateway device 140 can record data regarding the operation of the vehicle, as well as driver activity including driver hours of service. Configurations of the gateway device 140 may include various analysis algorithms, program instructions, scripts, etc. The gateway device 140 can store the received and/or processed data in a memory of the gateway device 140 and/or the vehicle device 110 (e.g., a computer-readable storage medium). The gateway device 140 can communicate with the backend server 130 directly or indirectly (e.g., via the vehicle device 110) over the network 101 or other network. In some implementations, the gateway device 140 may be used to communicate with the backend server 130 in addition to or alternatively to the vehicle device 110.

Various example computing devices 110, 130, and 140 are shown in FIG. 1A. In general, the computing devices can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that allows a user to access interactive user interfaces, view images, analyses, or aggregated data, and/or the like as described herein. In various implementations, users may interact with various components of the example operating environment (e.g., the backend server 130) via various computing devices. Such interactions may typically be accomplished via interactive graphical user interfaces (GUI) or voice commands, however alternatively such interactions may be accomplished via command line, and/or other means.

Figure 4:
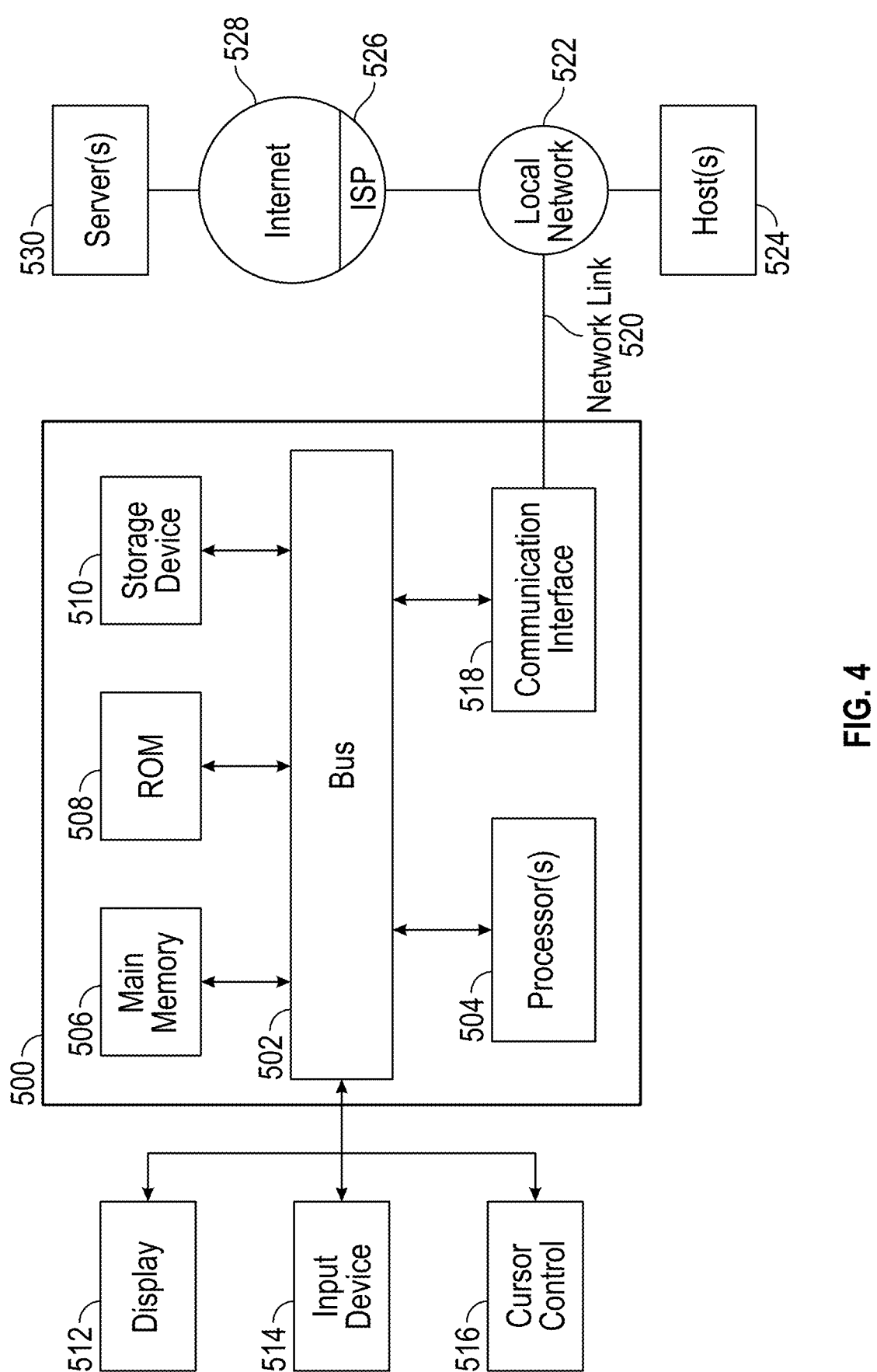
FIG. 4 illustrates an example computing system.

As shown in the example of FIG. 1A, communications between the vehicle device 110 and backend server 130 primarily occurs via network 101. Communication between the vehicle device 110 and the gateway device 140 can occur over a local wired or wireless connection or via network 101. The network 101 may include any wired network, wireless network (e.g., a Global System for Mobile Communications (GSM) network, a Code Division Multiple Access (CDMA) network, a Long Term Evolution (LTE) network, or any other type of wireless network), or combination thereof. For example, the network 101 may comprise one or more local area networks, wide area network, wireless local area network, wireless wide area network, the Internet, or any combination thereof. The network 101 can use protocols and components for communicating via the Internet or any of the other aforementioned types of networks. For example, the protocols used by the network 101 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. In some implementations, the vehicle device 110 transmits encrypted data via SSL (e.g., 256-bit, military-grade encryption) to the backend server 130 via high-speed 4G LTE or other wireless communication technology, such as 5G communications. FIG. 4 provides additional aspects of such computing components including the vehicle device 110, the backend server 130, and the gateway device 140.

Figure 1B:
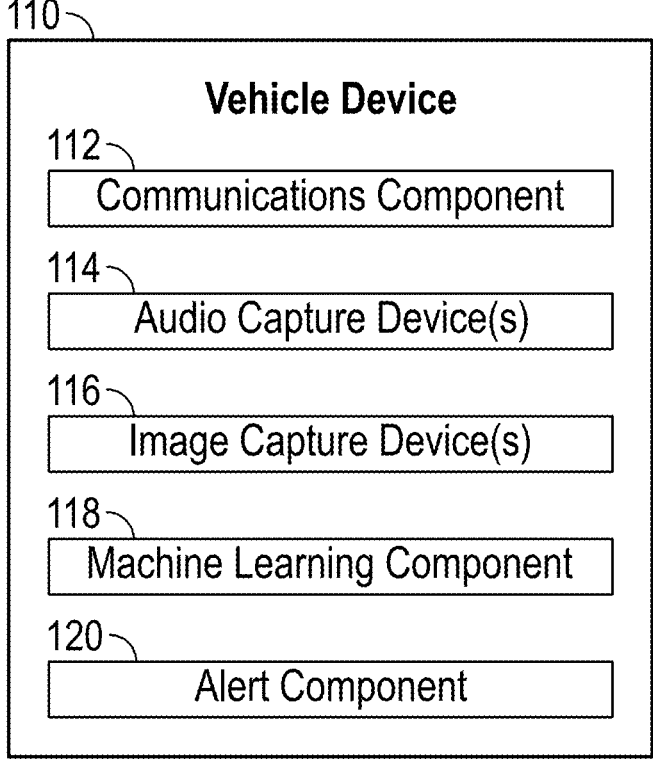
FIG. 1B illustrates an example vehicle device and various system subcomponents.

FIG. 1B illustrates an example vehicle device 110 and example subcomponents. The vehicle device 110 may include one or more of the following subcomponents: a communications component 112, one or more audio capture device(s) 114, one or more image capture device(s) 116, a machine learning component 118, and an alert component 120. In some implementations, the gateway device 140 may include one or more of the subcomponents 112, 114, 116, 118, 120, in addition to or alternatively to the vehicle device 110.

In some implementations, the communications component 112 may be configured to facilitate communication between the vehicle device 110 and other systems and devices. For example, the communications component 112 may facilitate communication with the backend server 130 and/or the gateway device 140. In some implementations, the communications component 112 may include one or more data input components and one or more data output components. The one or more data input components may be configured to receive and process various input data into vehicle device 110, such as audio data, video data, and the like. The one or more data output components may be configured to process and format various data and results of the various analyses for access by the vehicle device 110 and other systems, such as the backend server 130. For example, the one or more data output components may process and format event data for transmission to the backend server 130. The communication component 112 may generate and transmit data and/or alerts or notifications (e.g., related to safety events) to the backend server 130. Data and alerts transmitted by the communications component 112 may include emails, text messages, phone calls, platform notifications, and/or the like and may be variable for different implementations of the vehicle device 110.

The one or more audio capture devices 114 may be sensors of the vehicle device 110. Each audio capture device 114 may be configured to receive and process audio received by the vehicle device 110 and generate audio signals/data. The audio capture device 114 can be/can include one or more microphones. Audio received by the audio capture device 114 can include vehicle audio (e.g., generated by a vehicle turn signal, a vehicle engine, etc.), user audio (e.g., voice commands or responses of an occupant of the vehicle), external audio (e.g., sounds outside of the vehicle), and/or the like. In some implementations, the audio capture devices 114 may be configured to process audio from a driver, such as for voice control. For example, the vehicle device 110 may be configured to receive instructions from the driver which may relate to data to transmit to the backend server 130. In some implementations, the vehicle device 110 may be configured for wake word detection.

The one or more image capture devices 116 may be sensors of the vehicle device 110. Each image capture device 116 can be configured to capture visual information and convert the visual information into a digital format that can be processed and/or stored by the vehicle device 110 and/or other systems (e.g., the backend server 130). The image capture device 116 can be/can include one or more cameras. For example, the one or more image capture device 116 can include an outward-facing camera and/or an inward facing camera. When the vehicle device 110 is mounted in a vehicle, the outward-facing camera can be positioned to obtain images forward of the vehicle. When the vehicle device 110 is mounted in a vehicle, the inward-facing camera can be positioned to obtain images within the vehicle, including images of the driver and/or other vehicle occupants. In other implementations, the vehicle device 110 may include different quantities of video and/or still image cameras.

The machine learning component 118 can be configured to process input data received by the vehicle device 110 such as audio data from the audio capture device 114, image data from the one or more image capture device 116, vehicle signal data from the gateway device 140, and/or the like. In some implementations, the vehicle device 110 may include an individual event models to process each different type of data. For example, the machine learning component 118 can include a first event model for processing audio data, a second event model for processing image data, a third event model for processing vehicle signal data, etc. The event model(s) can be configured to process the input data to detect events. For example, the first event model can be an audio event detection model configured to process audio data from the audio capture device 114 to detect audio events. Audio events may indicate audio data of interest, such as a turn signal sounds being received by the audio capture device 114. In another example, the second event model can be an image event detection model configured to process image data from the one or more image capture device 116 to detect image events. Image events may indicate image data of interest, such as a vehicle's position relative to one or more traffic lanes being received by the image capture device 116. In yet another example, the third event model can be a vehicle signal event detection model configured to process vehicle signal data received from the gateway device 140. The vehicle signal data can be received via the vehicle device 110 or directly from the gateway device 140. Vehicle signal events may indicate vehicle signal data of interest, such as a vehicle signal that indicates a turn signal is activated in the vehicle. In some implementations, the one or more event models can process the received data in real-time as the events are occurring. In some implementations, the machine learning component 118 can include one or more event models configured to process multiple types of data (e.g., audio data, image data, and/or vehicle signal data). In some implementations, the machine learning component 118 may include a correlation component that can be configured to determine one or more relationships between or among different events (e.g., between audio events and image events, between audio events and vehicle signal events, etc.).

In some implementations, an event model can be trained in various ways. In the example of an event model trained to predict audio events (e.g., turn signal activation), the event model can be trained using audio data from operating vehicles (e.g., different types, makes, and models of vehicle). The training data can include audio data that includes instances of audio events and audio data that does not include instances of audio events. The event model can be trained to separate and identify the audio events from the background audio (e.g., vehicle sounds, occupant sounds, external sounds, and/or the like) in the training data. In implementations where the event model is configured to predict audio events that relate to signals generated by, the controller area network (CAN) bus (or other communications interface) of the vehicles, the audio data can be labeled based on the known generated signals from the vehicle bus. For example, audio training data can be recorded in an operating vehicle in a variety of different operating conditions and audio environments and the turn signal in the vehicle can be turned on and off periodically throughout the recording of the training data. The audio training data can then be labeled to identify the different audio events (e.g., when the turn signal is activated) based on vehicle signals generated by the vehicle bus and received by a gateway device, for example. In some implementations, the audio event models can be applied to audio data that is preprocessed to create a spectrogram (e.g., a mel Spectrogram, a frequency spectrogram, and/or the like). In this case, the spectrograms from the audio data can be labeled based on the vehicle signals from the vehicle bus to train the event models. In some implementations, the event models can be trained using supervised learning, self-supervised learning, and/or unsupervised learning. In some implementations, an event model may be configured for a specific type or size of vehicle. In some implementations, an event model may be configured for a range of different vehicles.

In some implementations, the event models can be further trained or re-trained (e.g., updated) using additional asset data or metadata (e.g., GPS data, IMU data, engine noise data). In the example of an event model configured to detect turn signals, an activated turn signal is usually accompanied by a vehicle action (e.g., position change on the road, change in vehicle driving direction, change in vehicle acceleration, change in engine noise, and/or the like). The event models can be trained on the audio data of an active vehicle and be further trained using the additional data to validate or invalidate the predictions of the event model.

In some implementations, the event models can be trained or re-trained using feedback from the drivers of vehicles. For example, when an event model generates an alert for a driver, this alert may prompt feedback from the driver that can relate to whether or not the alert was accurate. This driver feedback may be verified using additional data, such as the additional data described above to further verify if the alert/detected event was accurate. This driver data can be labeled and used to further train the event models. In some implementations, the data generated by the event models (e.g., the audio events) may be used to align data from multiple event models together. For example, an event model for audio event detection may be aligned with an event model for image detection based on the audio data.

The alert component 120 can be configured to generate alerts on or from the vehicle device 110 for the driver of the vehicle based on detected safety events. Alerts can include audio alerts (e.g., via a speaker), visual alerts (e.g., via a display, indicator light, GUI, etc.), haptic feedback, and/or the like. Alerts can be used to notify the driver that a safety event is occurring, which may relate to unsafe driving. For example, a safety event can include a vehicle lane departure or change occurring without an activated turn signal. In this case, the alert component 120 can notify the driver of the unsafe driving behavior and prompt the driver to take corrective action (e.g., activate a turn signal, return to the correct lane, etc.). In some implementations, activated alerts generated by the alert component 120 in response to safety events can prompt a notification or alert to be send to the backend server 130 via the communications component 112. For example, a fleet manger with access to the backend server 130 can monitor a fleet or vehicles for unsafe driving behavior based on safety events being triggered by the vehicle device 110.

Figure 1C:
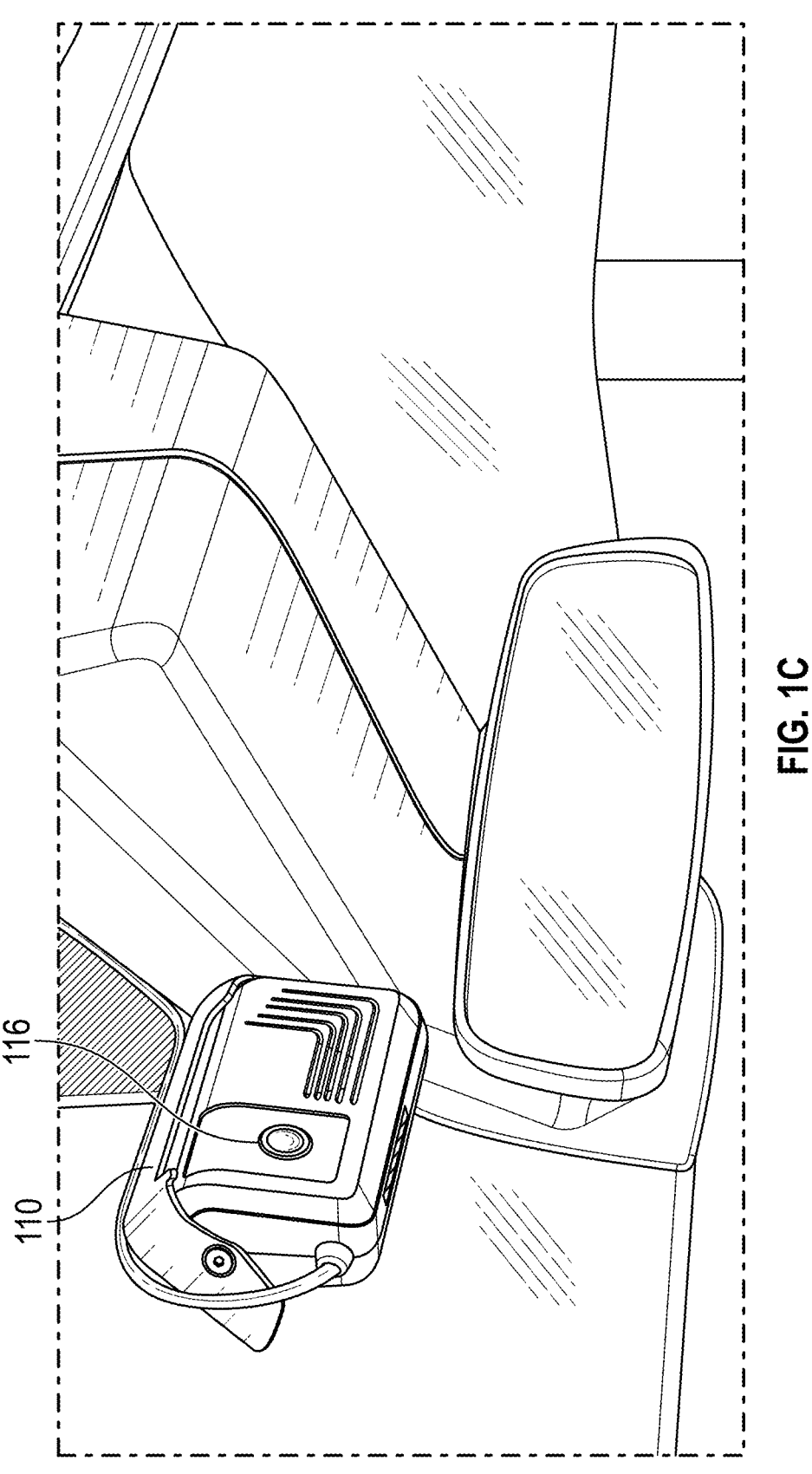
FIG. 1C illustrates an example vehicle device mounted inside a vehicle.

FIG. 1C illustrates an example vehicle device 110 with an inward-facing image capture device 116 mounted inside a vehicle. The vehicle device 110 can also include an outward-facing image capture device 116 (not shown) While the specifications of vehicle devices may vary greatly from one implementation to another, in one example implementation the vehicle device 110 may include some or all of the components below:

Outward-facing camera (e.g., the image capture device 116) with a field of view of 121° or more, resolution of at least 1080p (Full HD) video, frame rate of at least 30 frames per second, HDR to optimize for bright and low-light conditions.

Inward-facing camera (e.g., the image capture device 116) with a field of view of 177° or more to identify unsafe in-cab behaviors, resolution of at least 720p (HD)

video, frame rate of at least 30 frames per second, infrared LED for unlit nighttime in-cab video.

Audio input device(s) (e.g., the audio capture device 114) configured to capture audio from the vehicle, the vehicle occupants, and/or external to the vehicle.

Audio output device(s) (e.g., the alert component 120) configured to provide alerts in response to detection of safety events. In some implementations, audio output devices may be configured to provide voice coaching, such as voice-based feedback.

Recording capabilities and storage to record audio and video footage for a rolling time period. For example, 60-100 hours or more of driving time audio and video may be stored on the vehicle device 110, with an option for retrieval by the backend server 130, such as to provide additional context associated with a detected safety event. Video and audio data may be automatically uploaded to the backend server 130 (e.g., in the cloud) for further analysis, such as automatically uploading five seconds before to five seconds after each safety event is detected.

Data transfer circuitry configured to automatically upload event data to the backend server 130, where the event data may be further analyzed. In some implementations, the data transfer circuitry is configured to detect availability of cellular connectivity and, when connectivity is below a threshold, delay transmission of until cellular connectivity improves.

Enclosure for housing the sensors, data transfer security, and the link. The enclosure can be configured for attachment within the vehicle. For example, the enclosure can include mounting hardware for easily mounting on the inside of a windshield, such as with heavy duty acrylic foam tape, suction cup, hook and loop fasteners, or the like. Tilt control to allow for proper inward-facing orientation with a wide variety of windshields.

One or more accelerometers, such as accelerometers that measure acceleration (and/or related G forces) in each of multiple axes, such as in an X, Y, and Z axis.

One or more computer processors, such as high-capacity processors that enable concurrent neural networks for real-time artificial intelligence.

Example Safety Event Detection and Communications

FIG. 2A is a flow diagram illustrating an example process for the vehicle device 110 to detect safety events, such as by processing audio data and image data using one or more machine learning models. Certain additional or alternative blocks are depicted in FIG. 2A, as indicated by the blocks with dashed lines. It is recognized that there are other implementations of the method of FIG. 2A which may exclude some of the blocks shown and/or may include additional blocks not shown. Additionally, the blocks discussed may be combined, separated into sub-blocks, and/or or rearranged to be completed in a different order and/or in parallel.

At block 202, audio data is acquired by the audio capture device 114 of the vehicle device 110. Audio may be generated by the vehicle, occupants of the vehicle, and/or may be external to the vehicle. The audio data is stored by the vehicle device 110 for processing by one or more event models.

At block 204, image data is acquired by the image capture device 116 of the vehicle device 110. Image data may be generated by a forward-facing camera of the vehicle device 110 which can be positioned to obtain images in the front of the vehicle (e.g., including the road and road markings such road lanes). Image data can also be generated by an inward-facing camera of the vehicle device 110, which can be positioned to obtain images of the inside of the vehicle, including vehicle occupants. The image data is stored by the vehicle device 110 for processing by one or more event models. Generally, the audio data and the image data are acquired simultaneously.

In some implementations, additional data may be acquired by the vehicle device 110 along with the audio data and image data and can be stored for further processing or transmission. For example, metadata and/or vehicle signal data can be acquired by the vehicle device 110. The data acquired by the vehicle device 110 may be stored for a particular time period (e.g., 2, 12, 24 hours, etc.).

At block 206, one or more audio events are detected within the audio data via one or more event models. For example, audio data can be transmitted to a first event model for processing. The first event model can employ one or more audio processing algorithms to identify unique sound signatures related to audio events. In one example, the unique sound signatures can be generated based on a turn signal being activated within the vehicle. As such, an audio event can indicate that the turn signal is currently activated in the vehicle. In another example, an audio event can indicate that the turn signal is not currently activated in the vehicle. The first event model can process the audio data to determine the activation and duration of an audio event. As the first event model continues to process audio data, multiple audio events can be detected (e.g., each time the driver activates the turn signal).

In some implementations, the first event model may be configured to filter the audio data to identify audio events. For example, the first event model may create an audio spectrogram (e.g., a mel Spectrogram) by transforming the audio data into the frequency domain. In other implementations, the filtering may be completed by the audio capture device 114 or other components of the vehicle device 110 as part of a preprocessing step before inputting the spectrogram into the first event model. In some implementations, the first event model may process a moving average of the audio data. For example, audio data can be captured in discrete time windows or frames (e.g., 50 millisecond windows) and continuously fed into the first event model. The first event model may analyze audio data of a larger time window (e.g., a 1 second window), that is continuously updated to include the audio data from the latest frame. As such, the audio data can be processed by the first event model in real-time or near real time as the audio data is acquired by the audio capture device 114. For further clarity, the first event model may only be analyzing the spectrogram of the latest frame, having already analyzed the previous frames included in the larger window.

At block, 208, one or more image events are detected within the image data via one or more event models. For example, the image data can be transmitted to a second event model for processing. In some implementations, the image data can be processed by the same event model as the audio data. The second event model can employ one or more image processing algorithms to identify features within the image data. In one example, features can include a portion of the vehicle (e.g., a front end of the vehicle), which indicates the vehicles position and road marking/road lines such as centerlines, lane lines, edge lines, stop lines, crosswalk lines, turn arrows, pedestrian crossing lines, double lines, broken lines, curb lines, and/or the like. The features can include a position of the vehicle relative to the road markings. The detected features can be compared to image event criteria by the second event model to determine if an image event is occurring (e.g., if there is a match between the image event and the image event criteria). For example, image event criteria can characterize an image event as occurring if the vehicle is not positioned between the appropriate road markings (e.g., between two road lanes). For example, an image event may occur if any portion of the vehicle extends or crosses a road marking. The second event model can process the image data to determine the activation and duration of an image event. As the second event model continues to process image data, multiple image events can be detected (e.g., each time the driver crosses a road marking). In some implementations, the image data can be processed by the second event model in real-time or near real time as the image data is acquired by the image capture device 116. In some implementations, the second event model executed at the vehicle device 110 may be performed on downsampled images from the video feed generated by the image capture device 116. For example, a portion of the outward-facing video feed, such as a 300×300 pixel area of the 1920×1080 pixel video, may be extracted from the video feed to enable the low latency analysis needed to provide real-time alerts at the vehicle device 110. The extracted portion may change in size or position over time, such as in response to a periodic analysis of a frame of the video image to detect features of interest. In some implementations, additional asset data is periodically transmitted to the backend server 130, regardless of detection of safety events. For example, in some implementations a still image from the outward-facing video camera may be transmitted to the event analysis system every two minutes. Such additional asset data may be used in training the event models. Generally, the image event detection is completed simultaneously with the audio event detection of block 206.

In some implementations, the second event model may be configured to identify harsh events indicative of a sudden, extreme, and/or unexpected movement of the vehicle and/or driver. U.S. Pat. No. 11,341,786, titled "DYNAMIC DELIVERY OF VEHICLE EVENT DATA," issued on May 24, 2022, which is hereby incorporated by reference in its entirety and for all purposes, includes further methods and circuitry for detecting harsh events. In addition, or as an alternative, to detection of harsh events, in some implementations, the vehicle device 110 advantageously executes one or more event models on sensor data, such as video data received from the image capture device 116, to detect other safety events, such as a tailgating, forward collision risk, and/or distracted driver event. U.S. Pat. No. 11,643,102, titled "DASH CAM WITH ARTIFICIAL INTELLIGENCE SAFETY EVENT DETECTION," issued on May 9, 2023, which is hereby incorporated by reference in its entirety and for all purposes, includes further methods and circuitry for detecting safety events.

Next, at block 210, the vehicle device 110 can trigger a safety event in response to determining one or more relationships between or among the detected audio event and the detected image events. For example, the machine learning component 118 (via the correlation component) can compare the audio events and image events to identify relationships therebetween. In one example, a safety event may be triggered in response to detecting an image event is occurring without the detection of a corresponding audio event. For example, the safety event can indicate a lane change or departure is being made without an activated turn signal based on the image event detecting a lane departure and the audio event not indicating an activated turn signal. This type of safety even may be characterized by the vehicle device 110 as an unsafe event and may lead to an alert being generated, as explained with reference to block 212. In another example, a safety event may be triggered in response to detecting an image event is occurring with the detection of a corresponding audio event. For example, the safety event can indicate a lane departure is being made with an activated turn signal based on the image event detecting a lane change or departure and the audio event indicating an activated turn signal. This type of safety even may be characterized by the vehicle device 110 as a safe event and may not lead to an alert being generated.

In some implementations, the event detection settings, such as criteria and/or thresholds for detection of a safety event, may be determined by user configurable settings, allowing the user (e.g., an owner or manager of a fleet) to either use defaults based on vehicle type (e.g., passenger, light duty, or heavy duty), or to set custom combinations of conditions that are necessary for triggering of an event by the machine learning models executed on the vehicle device 110. These event detection settings may be used in generation of event models, e.g., incorporated into the training data that is provided to machine learning component 118, and/or applied algorithmically, for example, as rules, to sensor data. For example, in some implementations, event models are configured to detect conditions indicative of a safety event by processing audio data and video data, and to output an indication of any detected event along with a confidence level of event detection. These outputs from the event models, along with other metadata and/or asset data, may then be used to evaluate user-configured event detection settings.

In some implementations, the event models that are executed for detection of events at the vehicle device 110 are optimized for low latency, high recall, and low precision. In some implementations, the backend server 130 may further include event models that are executed for detection of events that may be optimized for higher precision. Thus, the event models executed on the vehicle device 110 can be optimized to be executed in real-time (e.g., low latency), to have a high proportion of actual positives identified correctly (e.g., high recall), and to not be overly concerned with the proportion of positive identifications that were actually correct (e.g., low precision). Accordingly, the outputs of the event models at the vehicle device 110 may be provided in substantially real-time to the actual occurrence of a detected safety event, such that an alert and/or other preventative actions may be taken to minimize further risks. In contrast, the event models that are executed at the backend server 130 do not typically have the same time pressure and the backend server 130 includes significantly more processing power and bandwidth. Accordingly, in some implementations event models for detecting safety events may be trained at the backend server 130 for use with the low latency, high recall, and low precision constraints associated with the vehicle device 110 and provided to the vehicle device 110 periodically and/or when significant updates to the event models are made.

In some implementations, the method of FIG. 2A may optionally include block 212. At block 212, the vehicle device 110 is configured to generate an alert in response to the safety event being triggered. The alert can be an in-vehicle alert and may be generated by the alert component 120. In some cases, the in-vehicle alert may only be generated based on an unsafe event occurring, such as a unsignaled lane departure. Depending on the type of vehicle device 110 and or user settings, the type of in-vehicle alert may vary. For example, the in-vehicle alerts may be customized, such as based on the type of triggered event, severity of the event, driver preferences, etc. For example, in-vehicle alerts may include various audible signals and/or visual indicators of triggered safety events. In one example, an audio alert may be generated by the vehicle device 110 and delivered to the operator of the vehicle. In another example, a visible alert may be generated and displayed on the vehicle device 110. For example, the visible alert can be a light or other visual display intended to alert the driver that a safety event is occurring. In an example where the vehicle device 110 includes a GUI, the alert may be displayed on the GUI. In yet another example, the alert may include haptic feedback. For example, the vehicle device 110 may vibrate in response to a detected safety event. In some implementations, one or more of these types of in-vehicle alerts may be generated simultaneously.

In some implementations, the type and/or severity of the in-vehicle alert may vary based on the audio environment in the audio data being captured by the audio capture device 114. For example, where high volume audio is being received by the audio capture device 114, such as when loud music is playing in the vehicle, the volume or tone of an audible alert generated by the vehicle device 110 may be changed such that the operator of the vehicle can hear the alert over the sound of the music. In another example, where the alert matches the frequency or tone of the audio environment, the frequency or tone of the alert may be changed so that the alert can be heard by the driver. Additionally, or alternatively, a visual alert may be generated when the audio capture device 114 detects loud audio from the vehicle. In some implementations, the quantity, severity, and/or type of the in-vehicle alerts provided to a driver may be changed based feedback from the driver. Feedback from the driver can include audible feedback received by the vehicle device and/or other types of feedback such visual feedback processed by an inward-facing camera of the vehicle device 110. This feedback may indicate a driver's emotions or mood, which may change the in-vehicle alerts. For example, the vehicle device 110 may use facial recognition to determine how the driver is responding to alerts (e.g., if the driver is becoming agitated, the attention level of the driver, and/or the like), and modify the alerts accordingly.

In some implementations, the vehicle device 110 may be configured to transmit a notification or alert to the backend server 130 in response to the detected safety event. For example, the communications component 112 can be configured to transmit data to the backend server 130 and/or user devices associated with the backend server 130 in response to the vehicle device 110 detecting an unsafe event occurring. In this example, the user may be a fleet manager, safety manager, parent or guardian of the driver, or the like, that receives the alert and may take action to ensure that the unsafe driving is remedied. The user alert may be delivered via SMS, text message, or application-specific alert, or may be delivered via a safety dashboard, email, and/or via any other communication medium associated with the backend server 130. In the example of the fleet manager, the user alert can allow a fleet manager to track when unsafe actions, such as unsignaled lane departures, are occurring in an active vehicle and allow the fleet manager to take appropriate action. In one example, a GUI may be generated on a user device associated with the backend server 130 in response to a detected safety event as described with reference to FIG. 3.

Using a vehicle device to generate alerts (e.g., for the driver or the fleet manager) based on applying an event model to audio data can provide certain benefits for improved alerting across a wide range of vehicles without requiring knowledge of the signals generated by each specific CAN bus of different vehicles that relate to audio events. For example, each different make, model, and/or type of vehicle may have a different type of signal generated by the CAN bus that corresponds to a turn signal being activated in the vehicle. As such, a system relying solely on the vehicle signals to detect activated turn signals would require knowledge of a wide range of different vehicles signals. Conversely, by applying event models to audio data that includes activated turn signals, the event models can be trained to apply to any type of vehicle that include similar audio patterns that relate to an activated turn signal. As such, the vehicle device 110 may require less training data to be used in a wider range of applications.

Figure 3:
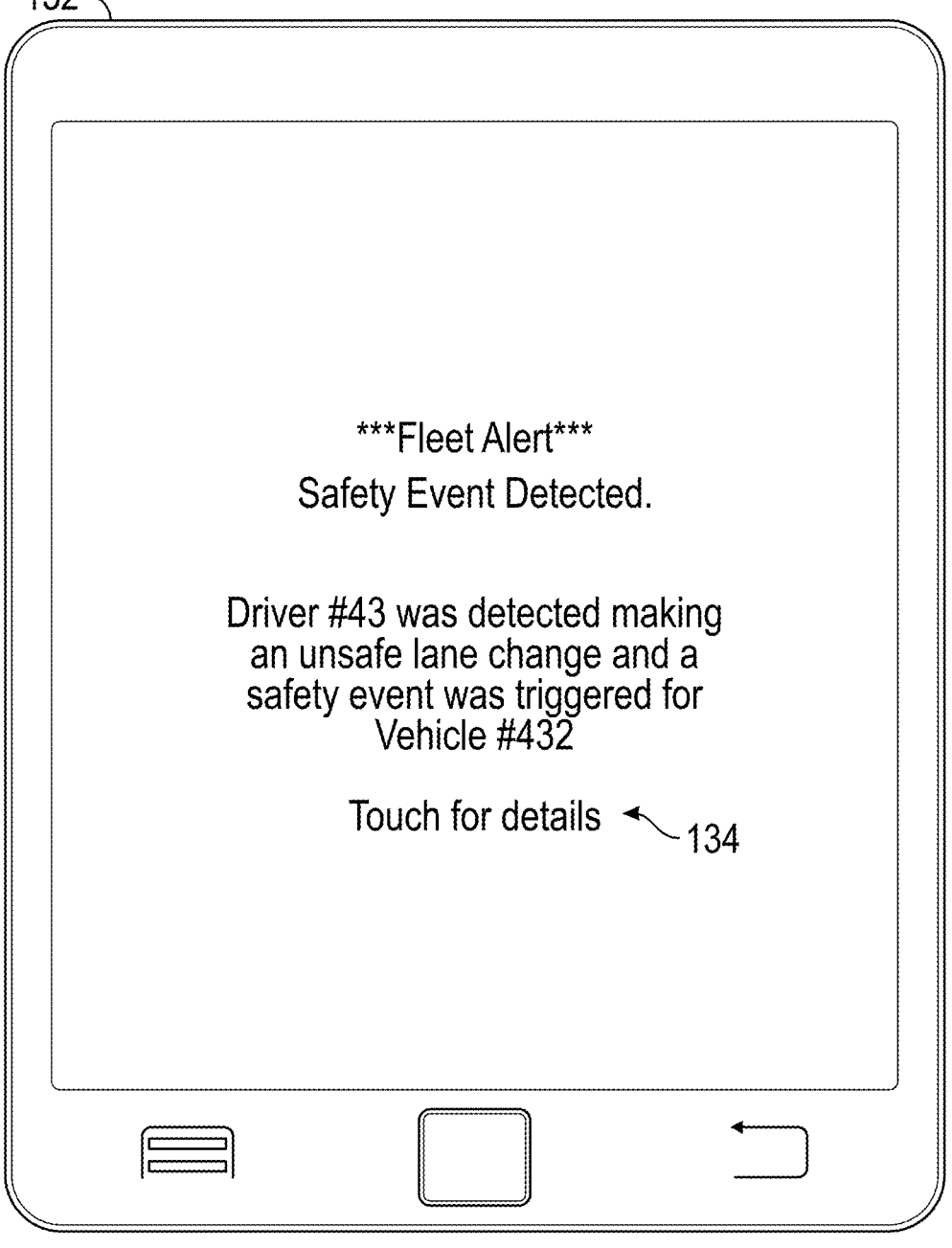
FIG. 3 illustrates an alert that may be transmitted to a user device to indicate that a safety event in the vehicle was detected.

In the example of FIG. 3, a user alert is generated by the vehicle device 110 and transmitted to a user device 132 connected to or associated with the backend server 130. For example, the user alert may be transmitted to the backend server 130 and then displayed by or transmitted to the user device 132. The user alert may indicate that a safety event has been detected. The user alert may further indicate the type of safety event (e.g., unsafe lane change) as well as the specific driver and the vehicle that triggered the safety event. The user alert may be displayed on a GUI of the user device 132. In some implementations, the GUI may include one or more user selectable links 134 that can be selected by the user to get more information about the safety event. For example, upon selection of the link 134, the GUI may update to include further event data, such as a video clip, audio clip or metadata, as described herein.

In some implementations, the method of FIG. 2A may optionally include block 214 and/or block 216. At block 214, the vehicle device 110 is configured to determine metadata associated with a safety event. For example, the vehicle device 110 can store metadata during the operation of the vehicle and may track the metadata that corresponds to safety events. At block 216, certain metadata and/or event data is transmitted to the backend server 130. The metadata and/or event data may only be transmitted in response to an unsafe event occurring and may not be transmitted for a detected safe event occurring. In some implementations, the metadata and/or event data may be transmitted immediately upon detection of a safety event, such that a safety manager may immediately be alerted of a situation where action may be prudent. Certain asset data associated with the alert, such as audio files, video files and/or other larger asset data, may be transmitted to the backend server 130 sometime after the safety event has triggered, such as when cellular communication bandwidth is available for transmission of video data. In some implementations, asset data may be transmitted to the backend server 130 in response to requests for specific asset data from the event analysis system.

In some implementations, metadata transmitted to the backend server 130 may include data from one or more external sources, such as traffic or weather data, which may be helpful in making better determinations of camera obstruction, for example. In some implementations, the event models executed at the vehicle device 110 and/or the backend server 130 performs feature detection that produces metadata indicating traffic and/or weather conditions, such as by analyzing video data from the outward-facing camera.

In some implementations, asset data, such as audio data and video data, are recorded in a sensor data store of the vehicle device 110, even though such asset data may not be transmitted to the backend server 130 initially upon triggering of a safety event (e.g., at block 210). In some implementations, the asset data may be later transmitted when the communication link supports transmission of the asset data, such as when the vehicle is within a geographic area with a high cellular data speed. Alternatively, the asset data may be transmitted when connected on a nightly basis, such as when the vehicle is parked in the garage and connected to Wi-Fi (e.g., that does not charge per kilobyte). Accordingly, the vehicle device 110 can advantageously provide immediate in-vehicle alerts upon detection of a safety event, while also allowing the backend server 130 to later receive asset data associated with the detected safety events, such as to perform further analysis of the events (e.g., to update machine learning models applied by the vehicle device) and/or to include certain asset data in a safety dashboard.

In some implementations, once a particular asset data is transmitted to the backend server 130, that particular asset data is removed from the sensor data store of the vehicle device 110. For example, if a five second video clip associated with a detected safety event is transmitted to the event analysis system, that five second portion of the video stream may be removed from the sensor data store. In some implementations, asset data is only deleted from the vehicle device 110 when the backend server 130 indicates that the particular asset data may be deleted, or until the asset data has become stale (e.g., a particular asset data is the oldest timestamped data in the sensor data store and additional storage space on the sensor data store is needed for recording new sensor data).

As noted above, event models may include neural networks that are updated over time to better identify safety events. Thus, event data may become part of a training data set for updating/improving a neural network configured to detect the safety event. As noted above, a number of diverse types of algorithms may be used by the machine learning component 118 to generate the event models. The machine learning algorithms can be configured to adaptively develop and update the event models over time based on new input received by the machine learning component 118. For example, the event models can be regenerated on a periodic basis as new received data is available to help keep the predictions in the event model more accurate as the data is collected over time. Also, for example, the event models can be regenerated based on configurations received from the backend server 130.

In some implementations, the vehicle device 110 can include an option for the operator of the vehicle to provide feedback on accuracy of the detected events, such as an indication of whether the safety event actually occurred or if the triggering event should be considered a false positive. In one example, the audio capture device 114 can be used to capture human audio from the driver after an in-vehicle alert has been generated at block 212. In the example of an unsignaled lane departure, the driver's audio may indicate that they did signal and the vehicle device 110 may capture this feedback for transmission to the backend server 130. Based on this user feedback, the event models may be updated, potentially for transmission back to the vehicle device 110 as part of event model updates.

In some implementations, the method of FIG. 2A can optionally include detecting vehicle signal events via a vehicle signal capture device (e.g., the gateway device 140) and comparing the vehicle signal events with audio events to identify a first type of vehicle signal event that is correlated with a first type of audio event, as described in at least blocks 302-310 of FIG. 2B below.

FIG. 2B is a flow diagram illustrating an example process for a vehicle system to correlate vehicle signal events and audio events, such as by processing audio data and vehicle signal data using one or more event models. The vehicle system can include an audio capture device, such as the vehicle device 110 including the audio capture device 114 and a vehicle signal capture device. In some implementations, the vehicle signal capture device is the gateway device 140. As described herein, in some implementations, the gateway device 140 can be part of the vehicle device 110, while in other implementations, the gateway device 140 can be in communication with the vehicle device 110. In the method of FIG. 2B, "vehicle signal capture device" and "gateway device 140" will be used interchangeably. Certain additional or alternative blocks are depicted in FIG. 2B, as indicated by the blocks with dashed lines. It is recognized that there are other implementations of the method of FIG. 2B which may exclude some of the blocks shown and/or may include additional blocks not shown. Additionally, the blocks discussed may be combined, separated into sub-blocks, and/or or rearranged to be completed in a different order and/or in parallel.

At block 302, audio data is acquired by the audio capture device 114 of the vehicle device 110, as described with reference to block 202 of FIG. 2A.

At block 304, vehicle signal data is acquired by the gateway device 140. The gateway device 140 is connected to the vehicle bus of the vehicle and is configured to receive vehicle signals from the vehicle bus. The vehicle signal data can be transmitted to the vehicle device 110 via wired or wireless connection with the gateway device 140. The vehicle signal data is stored on the vehicle device 110 or the gateway device 140 for processing by one or more event models. Generally, the vehicle signal data and the audio data are acquired simultaneously.

At block 306, one or more audio events are detected within the audio data via one or more event models (e.g., a first event model), as described with reference to block 206 of FIG. 2A.

At block 308, one or more vehicle signal events are detected within the vehicle signal data via one or more event models. For example, the vehicle signal data can be transmitted to a third event model of the vehicle system for processing. In some implementations, the vehicle signal data is processed by the third event model on the vehicle device 110 or on the vehicle gateway device 140. In some implementations, the vehicle signal data can be processed by the same event model as the audio data. The third event model can identify different signal events based on the received data from the vehicle bus. For example, a vehicle signal event can indicate a type of signal received by the gateway device 140 that differs from the regular signals received by the gateway device 140 during the normal operation of the vehicle. In one example, the vehicle signal event could correspond to an activated turn signal. This type of vehicle signal would differ from the other vehicle signals received by the gateway device 140 because a vehicle signal indicating an activated turn signal is only generated periodically while the turn signal is activated in the vehicle by the vehicle operator. The third event model can process the vehicle signal data to determine the activation and duration of a vehicle signal event. As the third event model continues to process vehicle signal data, multiple vehicle signal events can be detected (e.g., each time the driver activates the turn signal). Vehicle signal events may also correspond to other vehicle signals received by the gateway device 140 that are unrelated to an activated turn signal. In some implementations, the vehicle signal data can be processed by the third event model in real-time or near real time as the vehicle signal data is acquired by the gateway device 140.

Next, at block 310, the vehicle system can determine that a first vehicle signal event is correlated with a first audio event based on determining one or more relationship between or among the detected first audio event and the detected first vehicle signal event. For example, the machine learning component 118 (via the correlation component) can compare the audio events and vehicle signal events to identify relationships therebetween. In one example, a correlation may be made in response to detecting a first vehicle signal event occurs at approximately the same time as the detection of a first audio event and/or that the first vehicle signal event does not occur when there is no detection of the first audio event. For example, the first audio event can indicate a lane departure is being made with an activated turn signal. The machine learning component 118 may rely on multiple cases of first vehicle signal events occurring during corresponding multiple cases of first audio events before the correlation is made. Determining which vehicle signal events are related to an activated turn signal can provide a benefit of allowing the vehicle device 110 to detect safety events based on use of one or both of the first vehicle signal events and the first audio events. Using the vehicle signal events to detect safety events may provide a benefit of improved event detection where the audio environment of the vehicle makes processing audio data difficult for the event models.

In some implementations, the method of FIG. 2B may optionally include one or more of blocks 312, 314, and 316. At blocks 312, the vehicle device 110 is configured to acquire image data via the image capture device(s) 116, as described with reference to block 204 of FIG. 2A. At block 314, one or more image events are detected within the image data via one or more event models (e.g., a second event model), as described with reference to block 208 of FIG. 2A.

At block 316, the vehicle device 110 can trigger a safety event in response to determining one or more relationship between or among the detected image events and at least one of the detected audio events or the detected vehicle signal events, similar to the process described with reference to block 210 of FIG. 2A. However, the process of block 316 differs from the process of block 210 because the machine learning component 118 can compare the image events to the audio events or the vehicle signal events to identify relationships therebetween. In one example, a safety event may be triggered in response to detecting an image event is occurring without the detection of a corresponding audio event or a corresponding vehicle signal event. For example, the safety event can indicate a lane departure is being made without an activated turn signal based on the image event indicating a lane departure and neither the audio event or the vehicle signal event indicating an activated turn signal. This type of safety even may be characterized by the vehicle device 110 as an unsafe event and may lead to an alert being generated, as explained with reference to block 212. In another example, a safety event may be triggered in response to detecting an image event is occurring with the detection of a corresponding audio event or the detection of a corresponding vehicle signal event. For example, the safety event can indicate a lane departure is being made with an activated turn signal based on the image event indicating a lane departure and the audio event or the vehicle signal event indicating an activated turn signal. This type of safety event may be characterized by the vehicle device 110 as a safe event and may not lead to an alert being generated. In some implementations, the method of FIG. 2B can optionally include the blocks 212, 214, and/or 216, as described with reference to FIG. 2A. In some implementations, using the correlation between the image events and the vehicle safety events can provide a benefit where the audio capture device 114 may have a difficult time detecting audio events, for example, when there is loud audio inside or outside the vehicle.

Figure 2C:
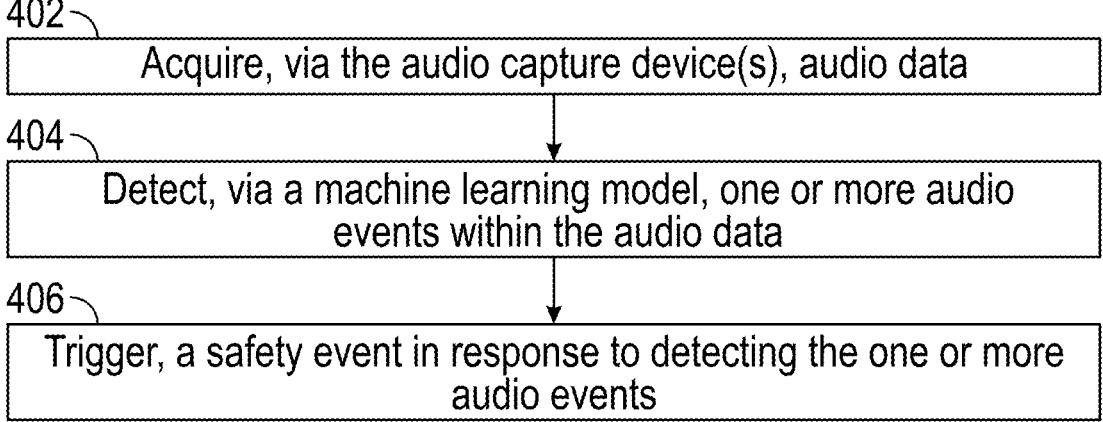

FIG. 2C is a flow diagram illustrating an example process for the vehicle device 110 to detect safety events, such as by processing audio data and/or other data using one or more event models. It is recognized that there are other implementations of the method of FIG. 2C which may exclude some of the blocks shown and/or may include additional blocks not shown. Additionally, the blocks discussed may be combined, separated into sub-blocks, and/or or rearranged to be completed in a different order and/or in parallel.

At block 402, audio data is acquired by the audio capture device 114 of the vehicle device 110, as described with reference to block 202 of FIG. 2A. At block 404, one or more audio events are detected within the audio data via one or more event models (e.g., a first event model), as described with reference to block 206 of FIG. 2A.

Next, at block 406, a safety event is triggered in response to detecting one or more audio events, similar to the process described with reference to block 210 of FIG. 2A, except the one or audio events may not be compared to additional event data, depending on the type of audio event, as described below. For example, for some types of audio events, a safety event can be triggered based solely on the audio event being detected. In other examples, the safety event may be triggered based on detecting one or more relationships between the detected audio events and detected other events (e.g., image events). In some implementations, an in-vehicle alert may be generated by the alert component 120 in response to the safety event, as described in block 212 of FIG. 2A. Similarly, in some implementation, a user alert may be transmitted to the backend server 130 in response to the safety event, as described in block 212 of FIG. 2A.

In some implementations, the event model can be configured to identity audio events that are indicative of unsafe driving or unsafe driving conditions for the vehicle. In such cases, the vehicle device 110 can generate alerts for the driver of the vehicle and/or for transmitting to the backend server 130. In cases of unsafe driving or unsafe driving conditions related to detected audio, alerts for the driver may not be required, as the nature of the audio events provide an alert to the driver. However, an alert transmitted to the backend server 130 for review by a fleet manager, for example, may be more important to track the driving patterns of the vehicle driver and identify cases of unsafe driving.

In various examples, the event model may identify an audio event based on detecting that other vehicles are honking at the vehicle containing the vehicle device 110 in the audio data. In another example, the event model may identify an audio event based on detecting sounds from rumble strips in the audio data. This audio event would indicate that the vehicle is driving too close to the side of the road. An in-vehicle alert from the vehicle device 110 may prompt a quicker correcting response from the driver, in particular when the in-cabin audio makes detecting the rumble sound difficult for the driver of the vehicle. In another example, the event model may identify an audio event based on detecting the sounds of a vehicle collision (e.g., a loud impact noise, screeching tires, breaking glass, metal crunching, horns or alarms, emergency vehicle sirens, and/or the like) in the audio data. In some implementations, the event model may compare the audio data to metadata from the vehicle device 110 to determine if the vehicle housing the vehicle device 110 was involved in the collision. For example, accelerometer data may indicate a vehicle collision. In some examples, where a vehicle collision is detected, the vehicle device 110 may be configured to contact emergency services automatically or after presenting the option to the driver or a user of the backend server 130. In some implementations, the event models may be trained to classify the size of a crash based on the audio data once crash-related metrics are released. For example, the insurance payout from a collision, the amount of damage to vehicles involved in the collision, and/or the like.

In another example, the event model may trigger a safety event in response to determining that the vehicle did not pull over in response to detecting an emergency vehicle with activated sirens near the vehicle. For example, the event model may identify an audio event based on emergency vehicle sounds in the audio data. The machine learning may also compare the audio events to image events indicative of emergency vehicle lights near the vehicle to confirm an emergency vehicle is located near the vehicle. In some cases, the event model can trigger a safety event based on detecting the emergency vehicle audio event while not detecting a deceleration or stoppage of the vehicle based on the metadata (e.g., the accelerometer data, GPS data, and the like).

In yet another example, the event model may trigger a safety event in response to determining that another vehicle is in the blind spot of the vehicle based on the audio data. For example, the audio data may indicate that another vehicle is driving close to the vehicle housing the vehicle device 110, and the event model can trigger a safety event based on the perceived location of the other vehicle. Similarly, the event model may use audio to detect a collision that cannot be detected by the forward-facing camera of the vehicle device 110, such as a side-swipe. In this example, additional data, such as data from the IMU, may be correlated with the audio data to identify the collision.

In some implementations, the event model can be configured to identity audio events that are indicative of vehicle maintenance issues for the vehicle. For example, the event model may identify an audio event based on detecting a change in the sound of the turn signal in the audio data. When the sound of the turn signal changes, the safety event could indicate that the indicator lights need to be changed. In another example, the event model may identify an audio event based on detecting a flat tire, or worn brakes, in the audio data. In yet another example, the event model may identify an audio event based on detecting a change in the engine sounds in the audio data. The event model may trigger a safety event when the audio event indicates a maintenance issue with the engine. In these examples, the audio data can be compared to additional asset data or metadata to determine if there is a vehicle issue. For example, if harsh breaking sounds are detected in the audio data, additional data (e.g., from the IMU) may be used to confirm if a harsh breaking instance occurred or if there is an issue with the vehicle breaks. Audio data related to the engine performance can similarly be compared to additional data to verify if there is an engine performance issue.

In any of the aforementioned examples, the event model(s) can be trained to identify specific audio events that identify certain safety issues with the vehicle. In some implementations, the audio events can be compared to other data driven events prior to triggering a safety event. In some cases, the safety events may provide an in-vehicle alert to the driver, particularly when there is an immediate safety concern. In other cases, the safety events may prompt a notification or user alert being transmitted to the backend server 130, such as when routine but non-emergency maintenance is required.

Additional Implementation Details and Implementations

In an implementation the systems described herein (e.g., the vehicle device 110, the backend server 130, the gateway device 140, and/or the like) may include, or be implemented in, a "virtual computing environment". As used herein, the term "virtual computing environment" should be construed broadly to include, for example, computer-readable program instructions executed by one or more processors (e.g., as described in the example of FIG. 4) to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may include a modification of the operation of the virtual computing environment in response to inputs and according to various rules. Other functionality implemented by the virtual computing environment (as described throughout this disclosure) may further include modifications of the operation of the virtual computing environment, for example, the operation of the virtual computing environment may change depending on the information gathered by the system. Initial operation of the virtual computing environment may be understood as an establishment of the virtual computing environment. In some implementations, the virtual computing environment may include one or more virtual machines, containers, and/or other types of emulations of computing systems or environments. In some implementations the virtual computing environment may include a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can include a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices (e.g., the vehicle device 110, the backend server 130, the gateway device 140, and/or the like) from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," "service," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/ or other devices to function in a particular manner, such that the computer-readable storage medium having instructions stored therein includes an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a GUI, among other things.

For example, FIG. 4 shows a block diagram that illustrates a computer system 500 upon which various implementations and/or aspects (e.g., one or more aspects of the vehicle device(s) 110, one or more aspects of the backend server 130, one or more aspects of the gateway device(s) 140, and/or the like) may be implemented. Multiple such computer systems 500 may be used in various implementations of the present disclosure. Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random-access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The main memory 506 may, for example, include instructions to implement server instances, queuing modules, memory queues, storage queues, user interfaces, and/or other aspects of functionality of the present disclosure, according to various implementations.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), and/or the like, is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, may be coupled to bus 502 for communicating information and command selections to processor 504. Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 500 may include a user interface module to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware and/or program logic which in combination with the computer system causes or programs computer system 500 to be a special-purpose machine. According to one implementation, the techniques herein are performed by computer system 500 in response to processor(s) 504 executing one or more sequences of one or more computer-readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Example Clauses

Examples of implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A vehicle device comprising: an enclosure configured for attachment within a vehicle, the enclosure housing at least: an audio capture device configured to acquire audio data; an image capture device configured to acquire image data; one or more hardware computer processors; and one or more computer-readable storage mediums having software instructions stored thereon, the software instructions executable by the one or more hardware computer processors to cause the vehicle device to perform operations comprising: detecting, based at least on application of at least a first machine learning model to the audio data as it is acquired by the audio capture device, an audio event within the audio data; detecting, based at least on application of at least a second machine learning model to image data as it is acquired by the image capture device, an image event within the image data; and triggering a safety event in response to determining a relationship between the audio event and the image event.

Clause 2. The vehicle device of Clause 1, wherein the audio event indicates that a turn signal in the vehicle is or is not activated.

Clause 3. The vehicle device of Clause 2, wherein the safety event indicates that a lane departure is occurring without the turn signal being activated based on the image event not being correlated with the audio event, wherein the software instructions are executable by the one or more hardware computer processors to cause the vehicle device to perform further operations comprising: in response to triggering the safety event, generating an alert to an operator of the vehicle.

Clause 4. The vehicle device of Clause 2 or Clause 3, wherein the safety event indicates that a lane departure is occurring with the turn signal being activated based on the image event being correlated with the audio event.

Clause 5. The vehicle device of any of Clauses 1-4, wherein the audio event indicate at least one of: a flat tire, an engine issue, or a signal light issue.

Clause 6. The vehicle device of any of Clauses 1-5, wherein the image capture device comprises at least an outward-facing camera positioned to obtain images of an area in front of the vehicle.

Clause 7. The vehicle device of any of Clauses 1-6, wherein the image data is processed by at least the second machine learning model in real-time as images are acquired by the image capture device.

Clause 8. The vehicle device of any of Clauses 1-7, wherein the audio data is processed by at least the first machine learning model in real-time as audio is acquired by the audio capture device.

Clause 9. The vehicle device of any of Clauses 1-8, wherein at least the second machine learning model is configured to detect features within the image data, wherein image event is identified based on a determination that the detected features match image event criteria associated with the image event.

Clause 10. The vehicle device of Clause 9, wherein the features include a position of the vehicle relative to lane markings on a road.

Clause 11. The vehicle device of Clause 9, wherein the features include one or more of: accelerometer data, global positioning system (GPS) data, ECU data, or vehicle speed data.

Clause 12. The vehicle device of any of Clauses 1-11, wherein the software instructions are executable by the one or more hardware computer processors to cause the vehicle device to perform further operations comprising: determining metadata based on at least one of the audio data or image data that is associated with the safety event; and transmitting the metadata to an event management system.

Clause 13. The vehicle device of any of Clauses 1-12, wherein at least the first machine learning model is configured to filter the audio data to identify audio events.

Clause 14. The vehicle device of any of Clauses 1-13, wherein the software instructions are executable by the one or more hardware computer processors to cause the vehicle device to perform further operations comprising: creating an audio spectrogram by transforming the audio data into the frequency domain.

Clause 15. The vehicle device of any of Clauses 1-14, wherein the software instructions are executable by the one or more hardware computer processors to cause the vehicle device to perform further operations comprising: detecting, based at least on application of a third machine learning model to vehicle signal data as it is acquired by a vehicle signal capture device, one or more vehicle signal events within the vehicle signal data; and determining a first vehicle signal event, of the one or more vehicle signal events, is correlated with the audio event, based on a relationship between the audio event and the first vehicle signal event.

Clause 16. The vehicle device of Clause 15, wherein the first vehicle signal event indicates that a turn signal in the vehicle is activated.

Clause 17. A computer-implemented method comprising: by one or more hardware processors executing computer-readable instructions: detecting, based at least on application of at least a first machine learning model to audio data as it is acquired by an audio capture device of a vehicle device, an audio event within the audio data; detecting, based at least on application of at least a second machine learning model to image data as it is acquired by an image capture device of the vehicle device, an image event within the image data; and triggering a safety event in response to determining a relationship between or among the audio event and the image event.

Clause 18. The computer-implemented method of Clause 17, wherein the audio event indicates that a turn signal is or is not activated in a vehicle the vehicle device is attached to.

Clause 19. The computer-implemented method of Clause 18, wherein the safety event indicates that a lane departure is occurring without the turn signal being activated based on the image event not being correlated with the audio event, wherein the computer-implemented method further comprises: in response to triggering the safety event, generating an alert to an operator of a vehicle the vehicle device is attached to.

Clause 20. The computer-implemented method of Clause 18 or Clause 19, wherein the safety event indicates that a lane departure is occurring with the turn signal being activated based on the image event being correlated with the audio event.

Clause 21. The computer-implemented method of any of Clauses 17-20, wherein the audio event indicate at least one of: a flat tire, an engine issue, or a signal light issue.

Clause 22. The computer-implemented method of any of Clauses 17-21, wherein the image capture device comprises at least an outward-facing camera positioned to obtain images of an area in front of a vehicle the vehicle device is attached to.

Clause 23. The computer-implemented method of any of Clauses 17-22, wherein the image data is processed by at least the second machine learning model in real-time as images are acquired by the image capture device.

Clause 24. The computer-implemented method of any of Clauses 17-23, wherein the audio data is processed by at least the first machine learning model in real-time as audio is acquired by the audio capture device.

Clause 25. The computer-implemented method of any of Clauses 17-24, wherein at least the second machine learning model is configured to detect features within the image data, wherein image event is identified based on a determination that the detected features match image event criteria associated with the image event.

Clause 26. The computer-implemented method of Clause 25, wherein the features include a position of a vehicle the vehicle device is attached to relative to lane markings on a road.

Clause 27. The computer-implemented method of Clause 25, wherein the features include one or more of: accelerometer data, global positioning system (GPS) data, ECU data, or vehicle speed data.

Clause 28. The computer-implemented method of any of Clauses 17-27, further comprising: determining metadata based on at least one of the audio data or image data that is associated with the safety event; and transmitting the metadata to an event management system.

Clause 29. The computer-implemented method of any of Clauses 17-28, wherein at least the first machine learning model is configured to filter the audio data to identify audio events.

Clause 30. The computer-implemented method of any of Clauses 17-29, further comprising: creating an audio spectrogram by transforming the audio data into the frequency domain.

Clause 31. The computer-implemented method of any of Clauses 17-30, further comprising: detecting, based at least on application of a third machine learning model to vehicle signal data as it is acquired by a vehicle signal capture device, one or more vehicle signal events within the vehicle signal data; and determining a first vehicle signal event, of the one or more vehicle signal events, is correlated with the audio event, based on a relationship between the audio event and the first vehicle signal event.

Clause 32. The computer-implemented method of Clause 31, wherein the first vehicle signal event indicates that a turn signal is activated in a vehicle the vehicle device is attached to.

Clause 33. A system comprising: an audio capture device configured to acquire audio data; a vehicle signal capture device configured to receive vehicle signal data from a vehicle bus of a vehicle; one or more hardware computer processors; and one or more computer-readable storage mediums having software instructions stored thereon, the software instructions executable by the one or more hardware computer processors to cause the system to perform operations comprising: detecting, based at least on application of at least a first machine learning model to the audio data, an audio event within the audio data; detecting, based at least on application of at least a second machine learning model to the vehicle signal data, one or more vehicle signal events within the vehicle signal data; and determining a first vehicle signal event, of the one or more vehicle signal events, is correlated with the audio event, based on a relationship between or among the audio event and the one or more vehicle signal events.

Clause 34. The system of Clause 33, wherein the vehicle signal capture device is part of a vehicle gateway device.

Clause 35. The system of Clause 33 or Clause 34, wherein the audio capture device is part of a dash camera system configured for use in a vehicle, the dash camera system including an image capture device and the audio capture device.

Clause 36. The system of Clause 35, wherein the software instructions are executable by the one or more hardware computer processors to cause the system to perform further operations comprising: detecting, based at least on application of at least a third machine learning model to image data as it is acquired by the image capture device, an image event within the image data; and triggering a safety event in response to determining a relationship between or among the image event and at least one of the audio event or the one or more vehicle signal events.

Clause 37. The system of Clause 36, wherein the audio event indicates that a turn signal in the vehicle is or is not activated.

Clause 38. The system of Clause 37, wherein the safety event indicates that a lane departure is occurring without the turn signal being activated based on the image event not being correlated with at least one of the audio event or the one or more vehicle signal events, wherein the dash camera system is configured to deliver an alert to an operator of the vehicle in response to triggering the safety event.

Clause 39. The system of Clause 37 or Clause 38, wherein the safety event indicates that a lane departure is occurring with the turn signal being activated based on the image event being correlated at least one of the audio event or the one or more vehicle signal events.

Clause 40. A computer-implemented method comprising: by one or more hardware processors executing computer-readable instructions: detecting, based at least on application of at least a first machine learning model to audio data as it is acquired by an audio capture device of a vehicle device, an audio event within the audio data; detecting, based at least on application of at least a second machine learning model to vehicle signal data as it is acquired by a vehicle signal capture device configured to receive vehicle signal data from a vehicle bus of a vehicle, one or more vehicle signal events within the vehicle signal data; and determining a first vehicle signal event, of the one or more vehicle signal events, is correlated with the audio event, based on a relationship between or among the audio event and the one or more vehicle signal events.

Clause 41. The computer-implemented method of Clause 40, wherein the vehicle signal capture device is part of a vehicle gateway device.

Clause 42. The computer-implemented method of Clause 40 or Clause 41, wherein the audio capture device is part of a dash camera system configured for use in a vehicle, the dash camera system including an image capture device and the audio capture device.

Clause 43. The computer-implemented method of Clause 42, further comprising: detecting, based at least on application of at least a third machine learning model to image data as it is acquired by the image capture device, an image event within the image data; and triggering a safety event in response to determining a relationship between or among the image event and at least one of the audio event or the one or more vehicle signal events.

Clause 44. The computer-implemented method of Clause 43, wherein the audio event indicates that a turn signal in the vehicle is or is not activated.

Clause 45. The computer-implemented method of Clause 44, wherein the safety event indicates that a lane departure is occurring without the turn signal being activated based on the image event not being correlated with at least one of the audio event or the one or more vehicle signal events, wherein the dash camera system is configured to deliver an alert to an operator of the vehicle in response to triggering the safety event.

Clause 46. The computer-implemented method of Clause 44 or Clause 45, wherein the safety event indicates that a lane departure is occurring with the turn signal being activated based on the image event being correlated at least one of the audio event or the one or more vehicle signal events.

What is claimed is:

1. A vehicle device comprising:
an enclosure configured for attachment within a vehicle, the enclosure housing at least:
  an audio capture device configured to acquire audio data;
  an image capture device configured to acquire image data;
  one or more hardware computer processors; and
  one or more computer-readable storage mediums having software instructions stored thereon, the software instructions executable by the one or more hardware computer processors to cause the vehicle device to perform operations comprising:
    detecting, based at least on application of at least a first machine learning model to the audio data as it is acquired by the audio capture device, an audio event within the audio data;
    detecting, based at least on application of at least a second machine learning model to image data as it is acquired by the image capture device, an image event within the image data; and
    triggering a safety event in response to determining a relationship between the audio event and the image event.

2. The vehicle device of claim 1, wherein the audio event indicates that a turn signal in the vehicle is or is not activated.

3. The vehicle device of claim 2, wherein the safety event indicates that a lane departure is occurring without the turn signal being activated based on the image event not being correlated with the audio event, wherein the software instructions are executable by the one or more hardware computer processors to cause the vehicle device to perform further operations comprising:
  in response to triggering the safety event, generating an alert to an operator of the vehicle.

4. The vehicle device of claim 2, wherein the safety event indicates that a lane departure is occurring with the turn signal being activated based on the image event being correlated with the audio event.

5. The vehicle device of claim 1, wherein the audio event indicates at least one of: a flat tire, an engine issue, or a signal light issue.

6. The vehicle device of claim 1, wherein the image capture device comprises at least an outward-facing camera positioned to obtain images of an area in front of the vehicle.

7. The vehicle device of claim 1, wherein the image data is processed by at least the second machine learning model in real-time as images are acquired by the image capture device.

8. The vehicle device of claim 1, wherein the audio data is processed by at least the first machine learning model in real-time as audio is acquired by the audio capture device.

9. The vehicle device of claim 1, wherein at least the second machine learning model is configured to detect features within the image data, and wherein the image event is identified based on a determination that the detected features match image event criteria associated with the image event.

10. The vehicle device of claim 9, wherein the features include a position of the vehicle relative to lane markings on a road.

11. The vehicle device of claim 9, wherein the features include one or more of: accelerometer data, global positioning system (GPS) data, ECU data, or vehicle speed data.

12. The vehicle device of claim 1, wherein the software instructions are executable by the one or more hardware computer processors to cause the vehicle device to perform further operations comprising:

determining metadata based on at least one of the audio data or the image data that is associated with the safety event; and transmitting the metadata to an event management system.

13. The vehicle device of claim 1, wherein at least the first machine learning model is configured to filter the audio data to identify audio events.

14. The vehicle device of claim 1, wherein the software instructions are executable by the one or more hardware computer processors to cause the vehicle device to perform further operations comprising:

creating an audio spectrogram by transforming the audio data into the frequency domain.

15. The vehicle device of claim 1, wherein the software instructions are executable by the one or more hardware computer processors to cause the vehicle device to perform further operations comprising:

detecting, based at least on application of a third machine learning model to vehicle signal data as it is acquired by a vehicle signal capture device, one or more vehicle signal events within the vehicle signal data; and determining a first vehicle signal event, of the one or more vehicle signal events, is correlated with the audio event, based on a relationship between the audio event and the first vehicle signal event.

16. The vehicle device of claim 15, wherein the first vehicle signal event indicates that a turn signal in the vehicle is activated.

17. A computer-implemented method comprising:

by one or more hardware processors executing computer-readable instructions:

detecting, based at least on application of at least a first machine learning model to audio data as it is acquired by an audio capture device of a vehicle device, an audio event within the audio data;

detecting, based at least on application of at least a second machine learning model to image data as it is acquired by an image capture device of the vehicle device, an image event within the image data; and triggering a safety event in response to determining a relationship between or among the audio event and the image event.

18. A system comprising:

an audio capture device configured to acquire audio data;

a vehicle signal capture device configured to receive vehicle signal data from a vehicle bus of a vehicle;

one or more hardware computer processors; and one or more computer-readable storage mediums having software instructions stored thereon, the software instructions executable by the one or more hardware computer processors to cause the system to perform operations comprising:

detecting, based at least on application of at least a first machine learning model to the audio data, an audio event within the audio data;

detecting, based at least on application of at least a second machine learning model to the vehicle signal data, one or more vehicle signal events within the vehicle signal data; and determining a first vehicle signal event, of the one or more vehicle signal events, is correlated with the audio event, based on a relationship between or among the audio event and the one or more vehicle signal events.

19. The system of claim 18, wherein the vehicle signal capture device is part of a vehicle gateway device.

20. The system of claim 18, wherein the audio capture device is part of a dash camera system configured for use in a vehicle, the dash camera system including an image capture device and the audio capture device.

21. The system of claim 20, wherein the software instructions are executable by the one or more hardware computer processors to cause the system to perform further operations comprising:

detecting, based at least on application of at least a third machine learning model to image data as it is acquired by the image capture device, an image event within the image data; and triggering a safety event in response to determining a relationship between or among the image event and at least one of the audio event or the one or more vehicle signal events.

22. The system of claim 21, wherein the audio event indicates that a turn signal in the vehicle is or is not activated.

23. The system of claim 22, wherein the safety event indicates that a lane departure is occurring without the turn signal being activated based on the image event not being correlated with at least one of the audio event or the one or more vehicle signal events, wherein the dash camera system is configured to deliver an alert to an operator of the vehicle in response to triggering the safety event.

24. The system of claim 22, wherein the safety event indicates that a lane departure is occurring with the turn signal being activated based on the image event being correlated with at least one of the audio event or the one or more vehicle signal events.

* * * * *